United States Patent
Chikuma et al.

(10) Patent No.: US 6,874,230 B2
(45) Date of Patent: Apr. 5, 2005

(54) METHOD OF MANUFACTURING HEAT EXCHANGER

(75) Inventors: Hiroshi Chikuma, Kanagawa (JP); Yoshinobu Okuno, Barcelona (ES); Takahiro Nakakomi, Kanagawa (JP)

(73) Assignee: Calsonic Kansei Corporation, Tokyo (JP)

( * ) Notice: Subject to any disclaimer, the term of this patent is extended or adjusted under 35 U.S.C. 154(b) by 147 days.

(21) Appl. No.: 10/029,396

(22) Filed: Dec. 28, 2001

(65) Prior Publication Data

US 2002/0088119 A1 Jul. 11, 2002

(30) Foreign Application Priority Data

Dec. 28, 2000 (JP) ........................................ 2000-403382

(51) Int. Cl.⁷ ............................ B21D 53/06; B23P 15/26
(52) U.S. Cl. ............................ 29/890.046; 29/890.043; 29/890.045; 29/559; 29/464; 29/467; 29/727; 29/726.5; 165/173
(58) Field of Search ...................... 29/890.043, 890.045, 29/890.046, 559, 464, 467, 726, 726.5, 727; 165/135, 140, 173

(56) References Cited

U.S. PATENT DOCUMENTS

| | | | | |
|---|---|---|---|---|
| 3,246,691 A | | 4/1966 | La Porte et al. | |
| 4,611,375 A | * | 9/1986 | Zapawa | 29/890.046 |
| 5,129,144 A | | 7/1992 | Halstead et al. | |
| 5,214,847 A | * | 6/1993 | Aoki | 29/890.043 |
| 5,464,145 A | | 11/1995 | Park et al. | |
| 5,582,239 A | * | 12/1996 | Tsunoda et al. | 165/76 |
| 5,836,384 A | * | 11/1998 | Wijkstrom et al. | 165/173 |
| 5,924,485 A | * | 7/1999 | Kobayashi et al. | 165/173 |
| 5,947,196 A | * | 9/1999 | Halm et al. | 165/173 |
| 5,954,125 A | * | 9/1999 | Mantegazza et al. | 165/149 |
| 5,966,809 A | * | 10/1999 | Pierce | 29/890.047 |
| 6,095,239 A | * | 8/2000 | Makino et al. | 165/140 |
| 6,108,899 A | * | 8/2000 | Piccirilli | 29/726 |
| 6,179,049 B1 | * | 1/2001 | Higgins | 165/140 |
| 6,247,232 B1 | * | 6/2001 | Lambert et al. | 29/890.043 |
| 6,293,002 B1 | * | 9/2001 | Oh et al. | 29/726 |
| 6,364,005 B1 | * | 4/2002 | Makino et al. | 165/140 |
| 6,450,253 B1 | * | 9/2002 | Chikuma et al. | 165/173 |

FOREIGN PATENT DOCUMENTS

EP 0 936 024 A1 8/1999

* cited by examiner

*Primary Examiner*—Marc Jimenez
(74) *Attorney, Agent, or Firm*—Foley & Lardner LLP

(57) ABSTRACT

A method of manufacturing a heat exchanger includes processes of: arranging tubes at a predetermined pitch on a set base; inserting fins into spaces each defined between the tubes; compressing the tubes and the fins in the direction of arrangement thereof; mounting hollow headers to longitudinal ends of the tubes, each header having slits engaged with a corresponding end of the tubes; and attaching end covers to both ends of the headers, each cover closing holes which open at the corresponding end of the headers.

13 Claims, 35 Drawing Sheets

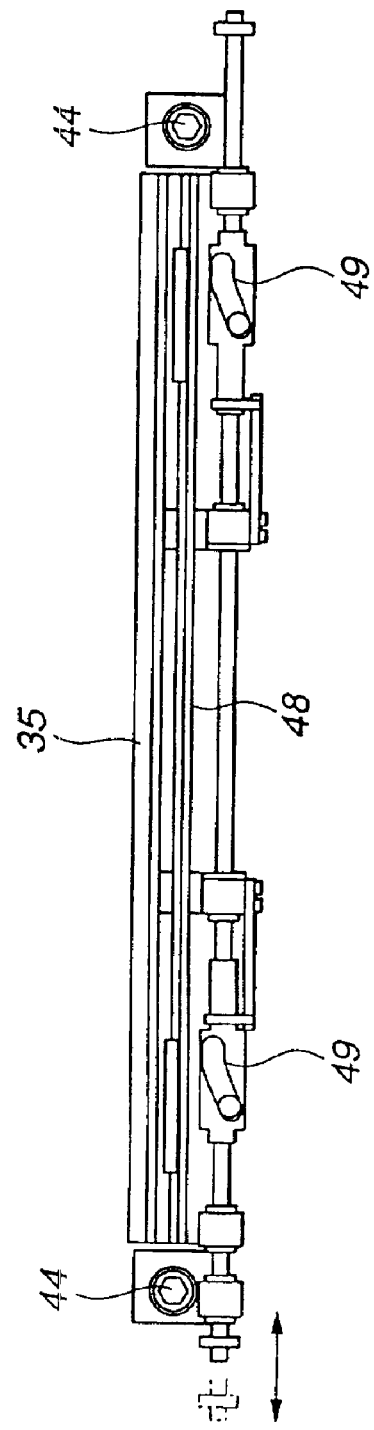
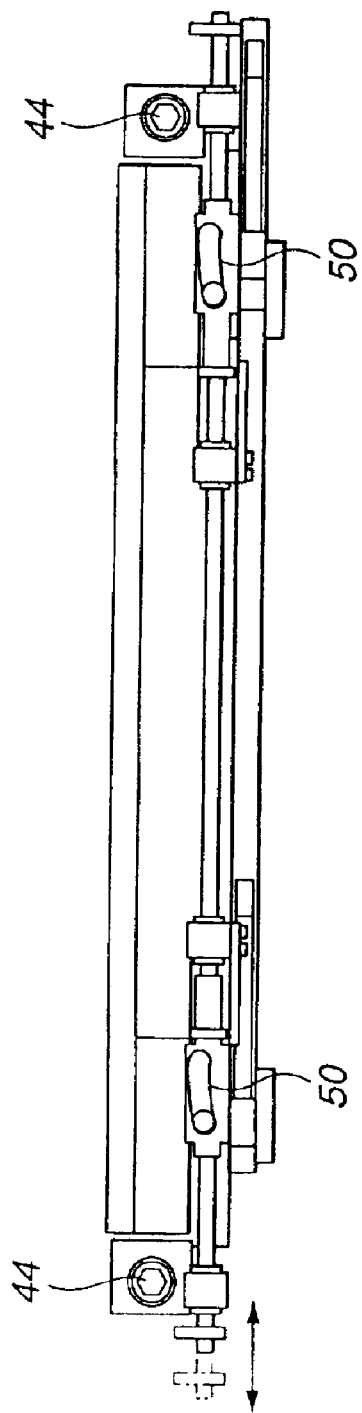
FIG.14A
FIG.14B

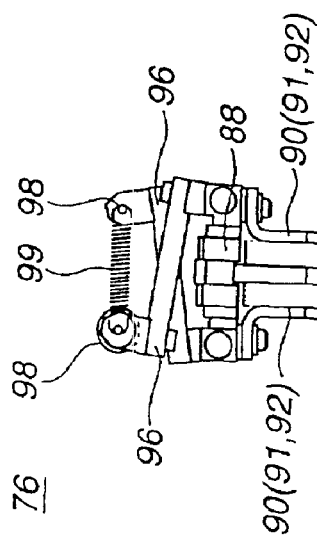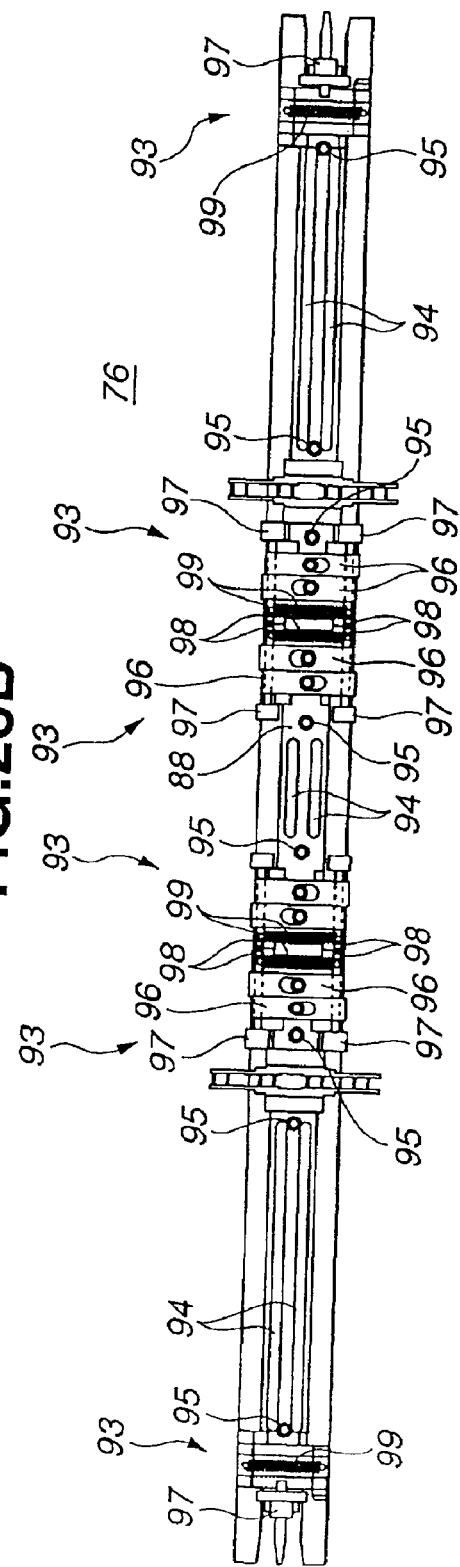
FIG.23A
FIG.23B

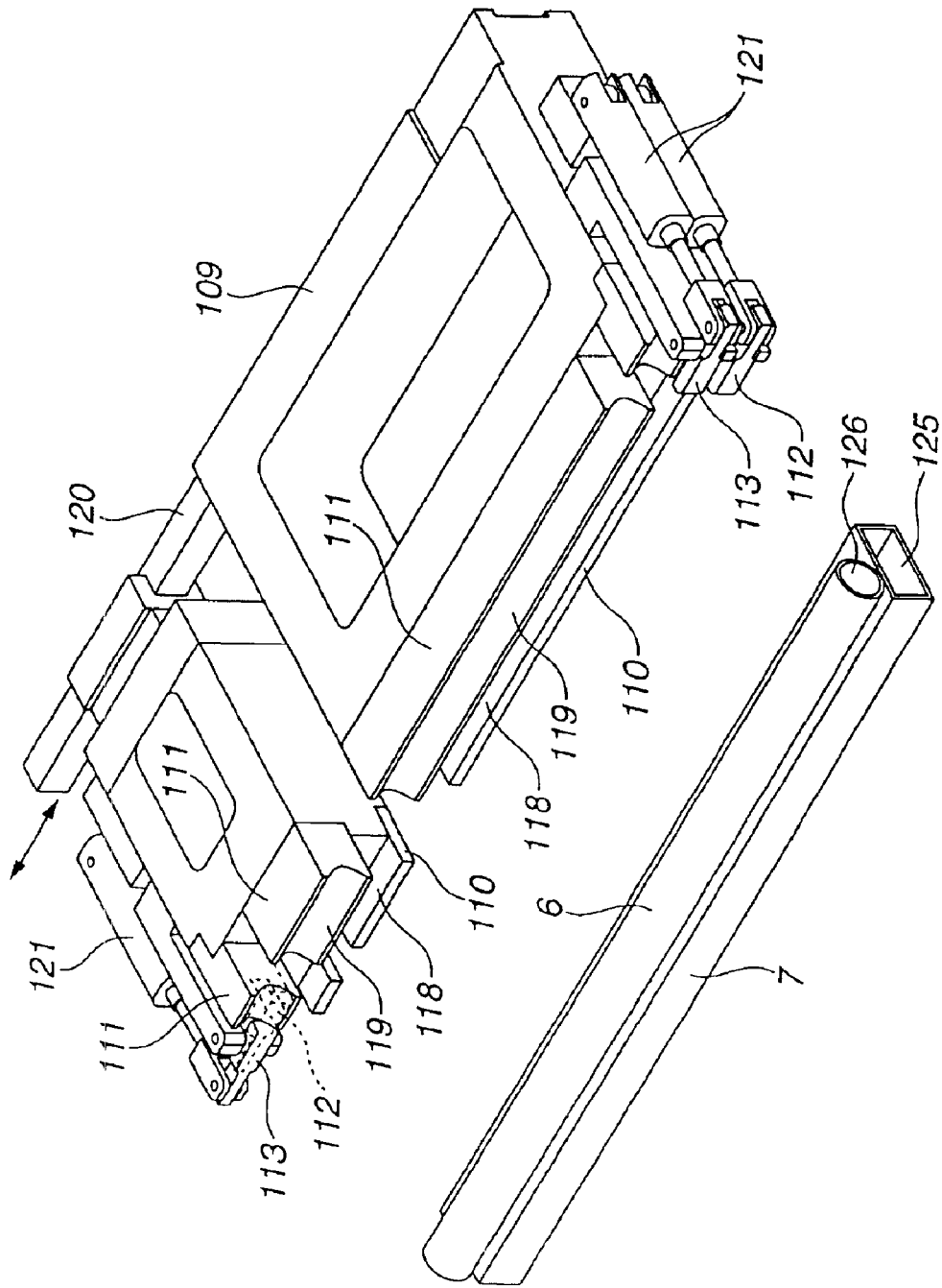

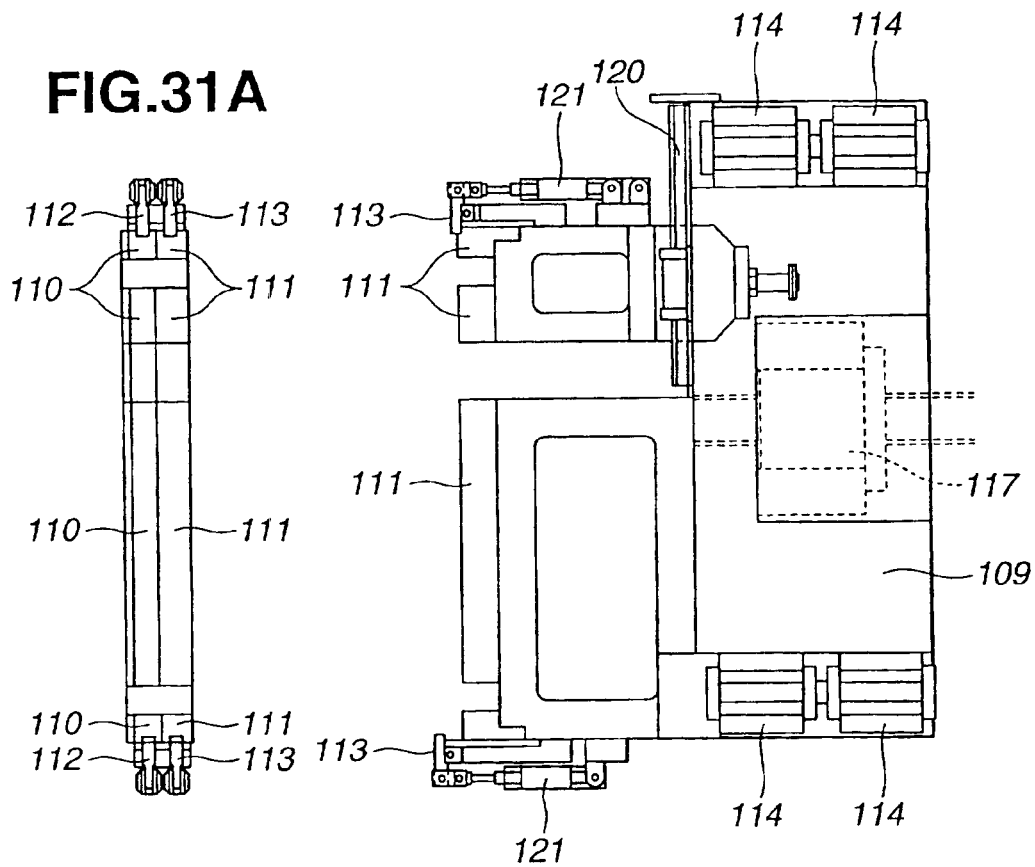
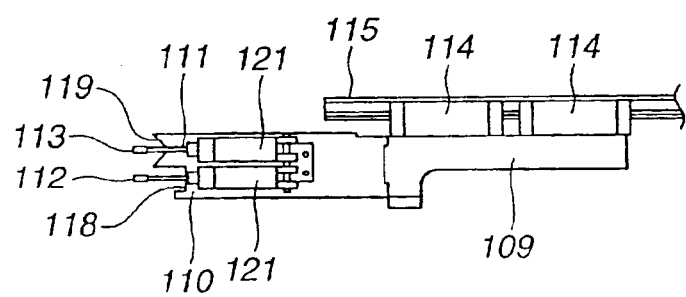
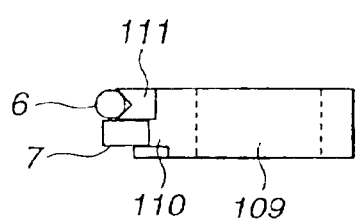
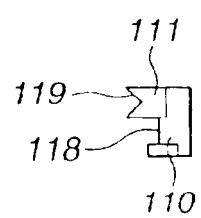

METHOD OF MANUFACTURING HEAT EXCHANGER

BACKGROUND OF THE INVENTION

The present invention relates to a method of manufacturing heat exchangers incorporating, for example, a radiator or a condenser or a radiator and condenser.

When manufacturing heat exchangers, tubes are arranged at a predetermined pitch, which is followed by insertion of fins therebetween. After compressing the tubes and fins, headers are mounted to the ends of the tubes. Other members such as pipe are also mounted to the assembly, to which a baking jig is attached. Then, the assembled heat exchanger is put in a furnace for brazing.

End covers are attached to both ends of the header. When mounting to the tubes the header with end covers attached, the following inconvenience may occur.

Upon mounting to the tubes, the center of the header in cross section is held by a clamper, which may cause, for the header of round pipe, for example, clamping displacement in such a way as to rotate about the header pipe. Moreover, when manufacturing heat exchangers incorporating a radiator and a condenser, it is difficult to arrange a radiator header and a condenser header above and below for clamping together.

Moreover, when using the end covers of the radiator header and condenser header integrated with each other, if the end covers are prior attached to the headers through press fitting, the relative position of slits formed in the headers for engaging with an end of tubes goes out of order in the longitudinal direction of the headers due to a press fitting stress. That is, the position of the slits of the radiator header and the position of the slits of the condenser header become misaligned, leading to impossible mounting of the headers to the tubes.

SUMMARY OF THE INVENTION

It is, therefore, an object of the present invention to provide a method of manufacturing heat exchangers, which allows secure mounting of the headers and accurate provision of the relative position of the slits formed in the headers.

The present invention provides generally a method of manufacturing a heat exchanger, which includes processes of: arranging tubes at a predetermined pitch on a set base; inserting fins into spaces each defined between the tubes; compressing the tubes and the fins in a direction of arrangement thereof; mounting hollow headers to longitudinal ends of the tubes, each header having slits engaged with a corresponding end of the tubes; and attaching covers to both ends of the headers, each cover closing holes which open at the corresponding end of the headers.

A main feature of the present invention is to provide a method of manufacturing an incorporated heat exchanger incorporating first and second heat exchangers, which includes processes of: arranging first tubes for the first heat exchanger at a predetermined pitch on a set base; arranging second tubes for the second heat exchanger at the same predetermined pitch just above the first tubes with a predetermined distance therebetween, the second tubes being longer than the first tubes; inserting fins into first spaces each defined between the first tubes and second spaces each defined between the second tubes, the fins extending over the predetermined distance; compressing the first and second tubes and the fins in a direction of arrangement thereof; mounting first hollow headers to longitudinal ends of the first tubes, each header having slits engaged with a corresponding end of the first tubes; mounting second hollow headers to longitudinal ends of the second tubes, each header having slits engaged with a corresponding end of the second tubes; and attaching covers to both ends of the first and second headers, each cover closing holes which open at the corresponding end of the first and second headers.

BRIEF DESCRIPTION OF THE DRAWINGS

The other objects and features of the present invention will become apparent from the following description with reference to the accompanying drawings, wherein:

FIG. 14A is a schematic drawing showing a cam drive mechanism for horizontally moving a tube supporting member;

FIG. 14B is a view similar to FIG. 14A, showing a cam drive mechanism for horizontally moving an end face restricting member;

FIG. 23A is a view similar to FIG. 20, showing the fin holding member with a fin clamp plate closed;

FIG. 23B is a view similar to FIG. 10, showing the fin holding member;

FIG. 30 is a fragmentary perspective view showing the header mounting device;

FIG. 31A is a fragmentary side view showing the header mounting device;

FIG. 31B is a fragmentary plan view showing the header mounting device;

FIG. 31C is a fragmentary front view showing the header mounting device;

FIG. 32A is a view similar to FIG. 28, showing a slide main body of the header mounting device;

FIG. 32B is a view similar to FIG. 32A, showing a radiator header positioning member and a condenser header positioning member;

DETAILED DESCRIPTION OF THE INVENTION

Figure 1A:
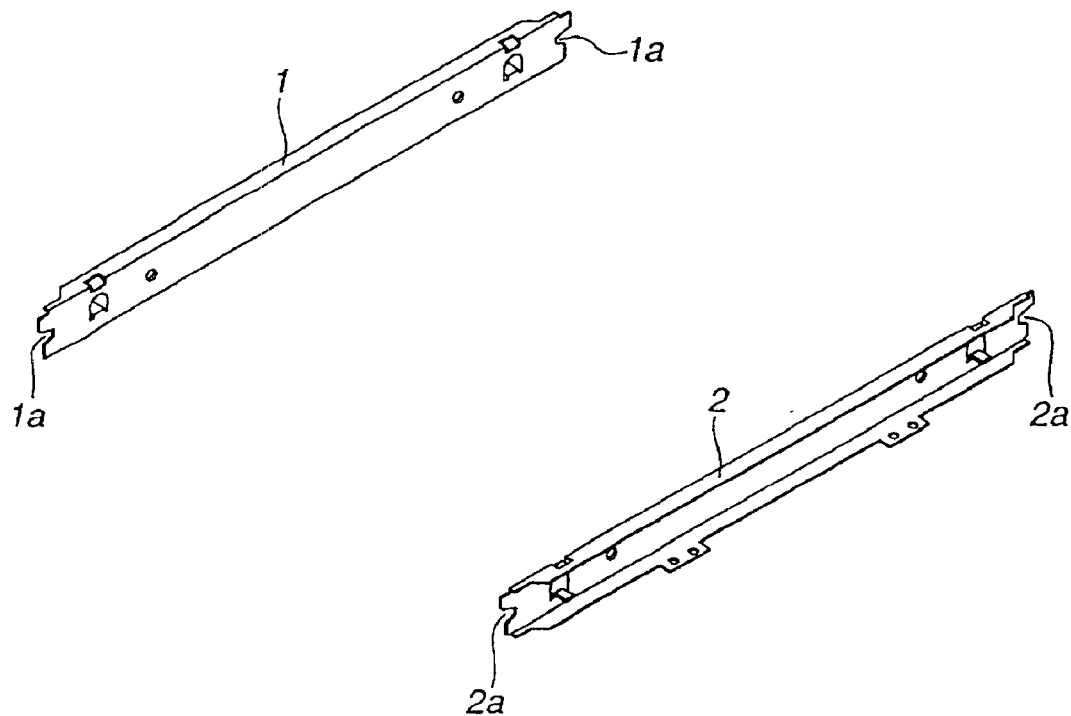
FIG. 1A is a perspective view showing a reinforce arranging process.

Referring to the drawings, a heat exchanger embodying the present invention is described in the sequence of A through F below.

A. Heat exchanger manufacturing process
B. Heat exchanger manufacturing system
  B-1. Fin forming part
  B-2. Radiator tube arranging part
  B-3. Condenser tube arranging part
  B-4. Fin inserting part
  B-5. Header mounting part C. Platen configuration
  C-1. Tube arranging device
  C-2. Temporary header holder
  C-3. Baking jig assembling device
D. Fin inserting device
  D-1. Conveyor
  D-2. Fin holding member
E. Header mounting device
  E-1. Slide main body
  E-2. Radiator header positioning member and condenser header positioning member
  E-3. Radiator header clamping member and condenser header clamping member
  E-4. Forward/backward movement driving means
F. Explanation of operation of heat exchanger manufacturing system
  F-1. Process before tube arranging
  F-2. Tube arranging process
  F-3. Fin inserting process
  F-4. Header mounting process In the illustrative embodiment, the present invention is applied to a system for manufacturing heat exchangers with a radiator and a condenser, for example, integrated with each other through a series of processes. Before explaining the configuration of the heat exchanger manufacturing system, the heat exchanger manufacturing process is explained briefly.

A. Heat Exchanger Manufacturing Process

Referring to FIG. 1A, when manufacturing a heat exchanger incorporating a radiator or first heat exchanger and a condenser or second heat exchanger, a pair of reinforces 1, 2 are prepared first. The reinforces 1, 2 are formed, for example, out of aluminum or aluminum alloy. One example includes a core material of Japanese Industrial Standards JIS3003 and a brazing material layer of JIS4045 or JIS4343 clad on the fin side.

Longitudinal ends of the reinforces 1, 2 are formed with notches 1a, 2a which receive tube supporting members 36 for restricting an end face position of fins 5 as will be described later. Forming the notches 1a, 2a prevents the tube supporting members 36 from colliding with the reinforces 1, 2 when restricting the end face position of the fins 5.

Figure 1B:
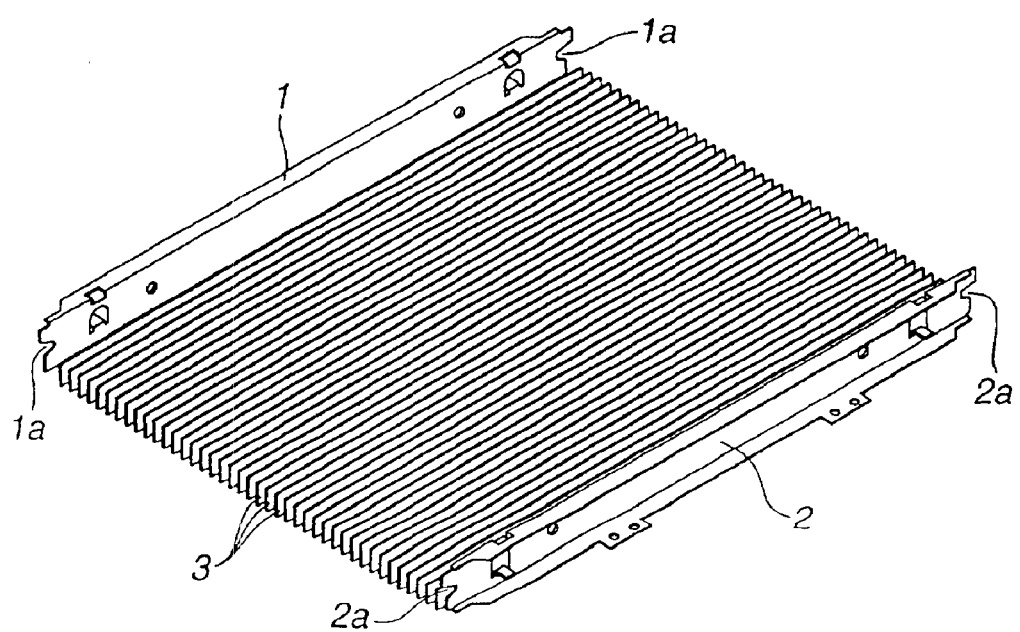
FIG. 1B is a view similar to FIG. 1A, showing a radiator tube arranging process.

Then, referring to FIG. 1B, after disposing the reinforces 1, 2 at a predetermined interval, a plurality of radiator tubes 3 or first heat exchanger tubes is arranged between the reinforces 1, 2 at a predetermined pitch. Arranging the radiator tubes 3A is carried out with a tube arranging device as will be described later. The radiator tubes 3 are formed, for example, out of aluminum or aluminum alloy. One example includes a core material of JIS3003, a brazing material layer of JIS4045 or JIS4343 clad on the outside of the tube, and a sacrifice corrosion layer of JIS7072 clad on the inside of the tube.

Figure 2A:
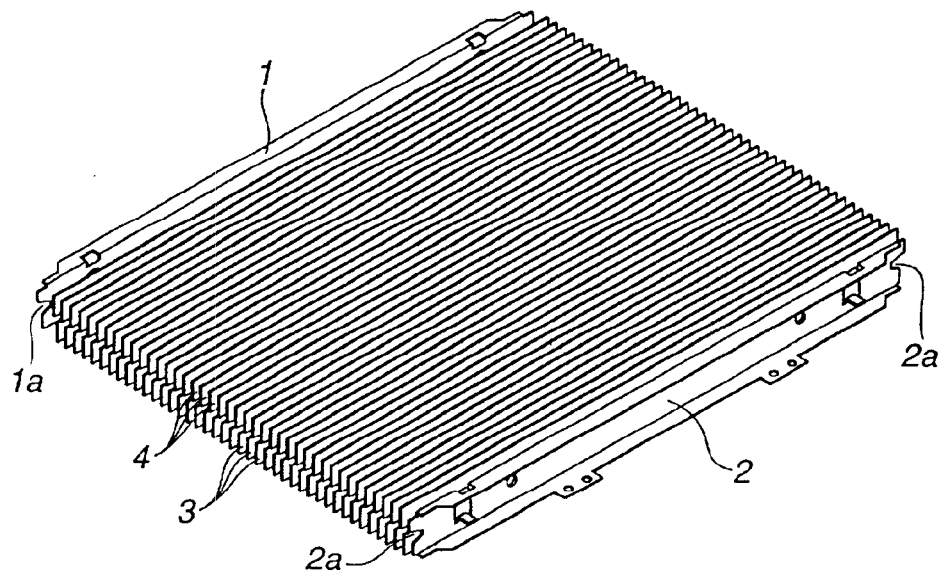
FIG. 2A is a view similar to FIG. 1B, showing a condenser tube arranging process.

Then, referring to FIG. 2A, at the same pitch as for the radiator tubes 3, condenser tubes 4 or second heat exchanger tubes are arranged just above the radiator tubes 3 with a predetermined distance therebetween. The condenser tubes 4 are also formed, for example, out of aluminum or aluminum alloy. One example includes a core material of JIS3003 and a brazing material layer of JIS4045 or JIS4343 clad on the outside of the tube, or extruded tube material of JIS1050 with sacrifice corrosion layer of zinc thermal-sprayed on its outside surface.

When viewing this arrangement from above, the radiator tubes 3 are disposed just below the condenser tubes 4. The tube arranging device also serves to arrange the condenser tubes 4 and the radiator tubes 3 with a predetermined distance therebetween. The condenser tubes 4 are slightly longer than the radiator tubes 3.

Figure 2B:
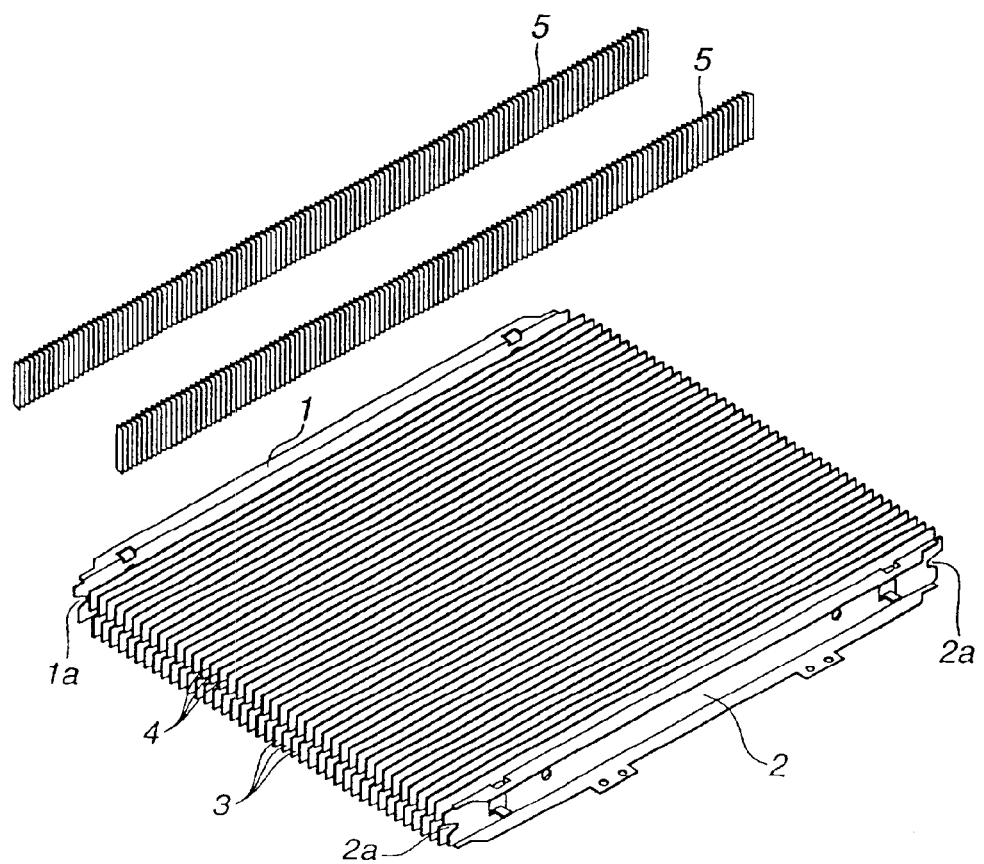
FIG. 2B is a view similar to FIG. 2A, showing a fin inserting process.

Then, referring to FIG. 2B, common fins 5 for radiator and condenser are arranged in a space defined between the radiator tubes 3 and condenser tubes 4 arranged at a predetermined spacing. Inserting the fins 5 in the space is carried out with a fin inserting device as will be described later. The fins 5 are also formed out of aluminum or aluminum alloy. One example includes a material of JIS3003 only or a core material of JIS3003 and a brazing material layer of JIS4045 or JIS4343 clad on both sides of the fins.

Figure 3:
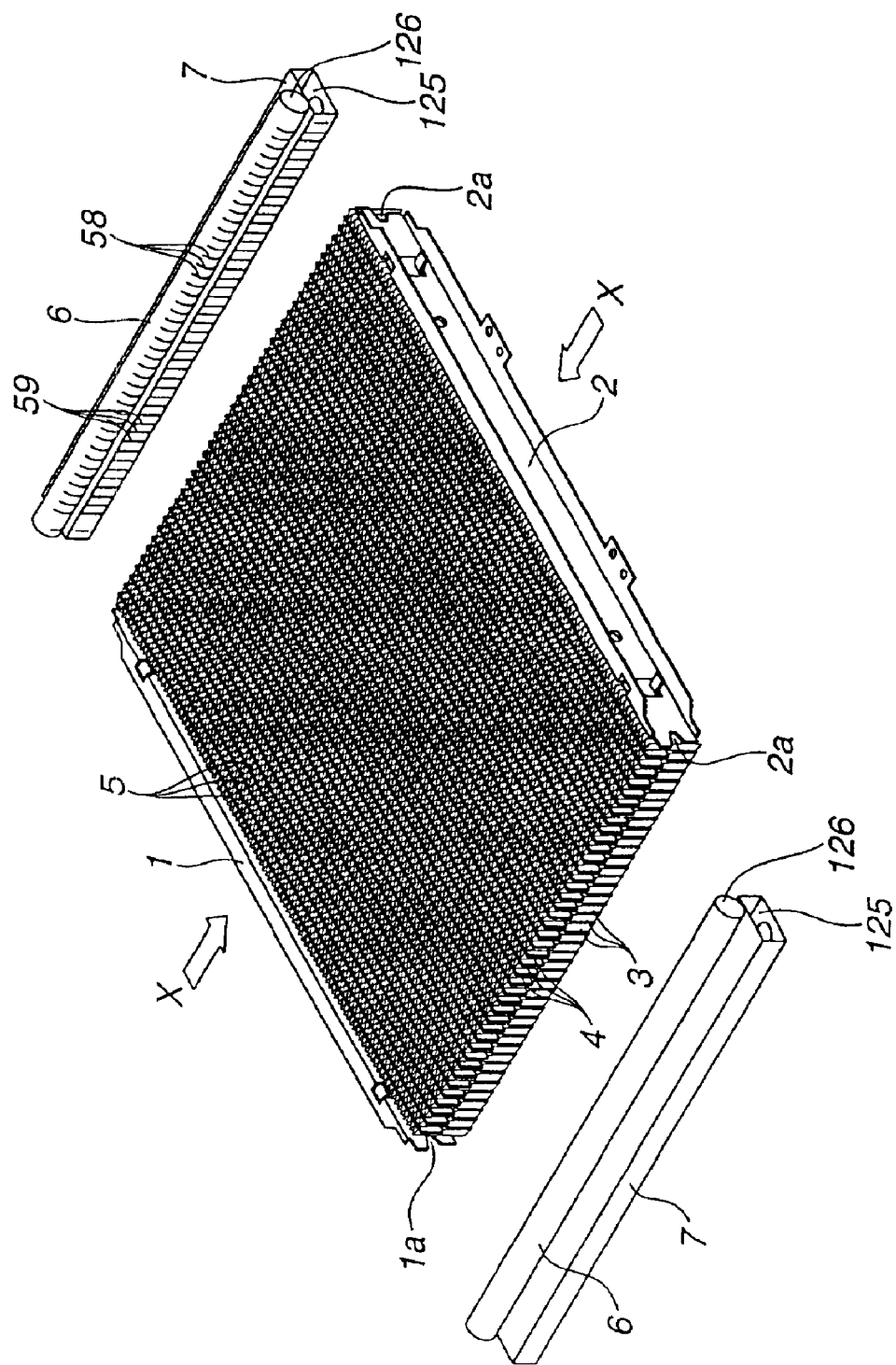
FIG. 3 is a view similar to FIG. 2B, showing a header mounting process.
Figure 4:
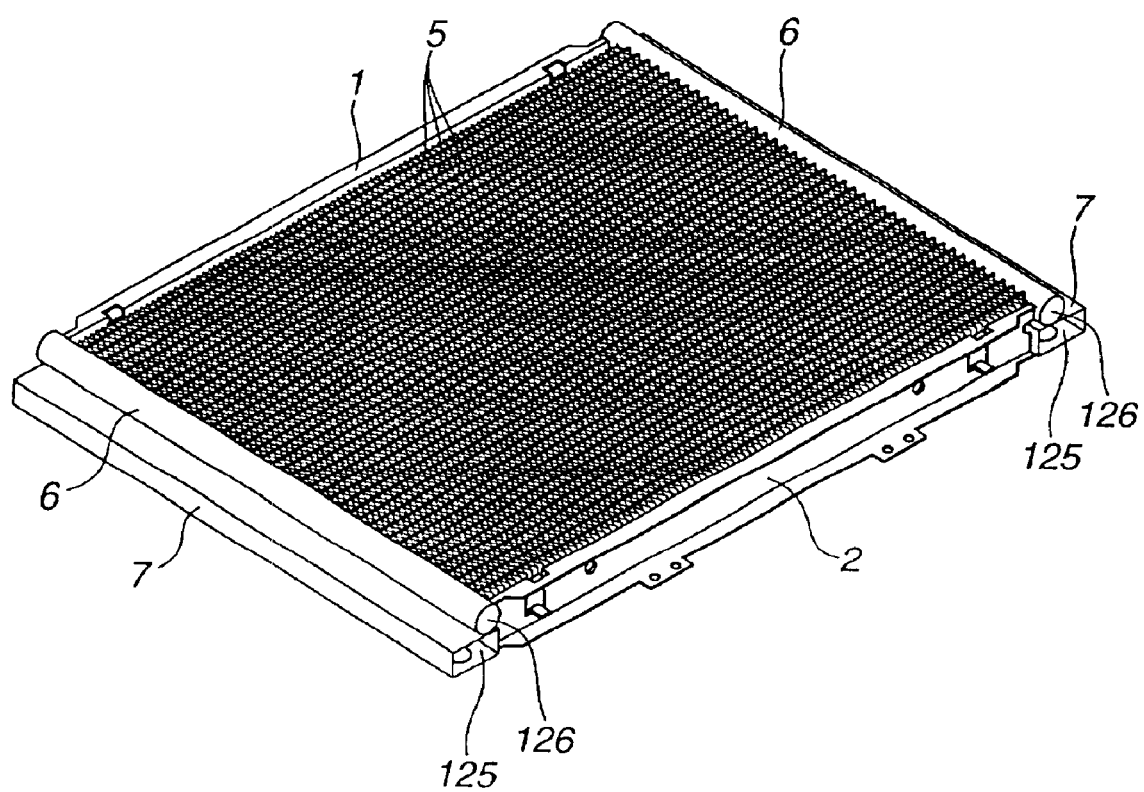
FIG. 4 is a view similar to FIG. 3, showing a header mounting completion process.

Then, referring to FIG. 3, compression is applied to the radiator tubes 3 and condenser tubes 4 in the direction of reducing their pitch interval or direction of arrow X. Specifically, compression is applied to the tubes 3, 4 in the direction of their arrangement to achieve a predetermined core width. Subsequently, referring to FIG. 4, radiator headers 7 or first heat exchanger headers are mounted to the radiator tubes 3, whereas condenser headers 6 or second heat exchanger headers are mounted to the condenser tubes 4. The radiator header 7 and condenser header 6 are also formed out of aluminum or aluminum alloy. One example of the radiator header 7 includes a core material of JIS3003, a brazing material layer of JIS4045 or JIS4343 clad on the outside of the header, and a sacrifice corrosion layer of JIS7072 clad on the inside of the header. One example of the condenser header 6 includes a core material of JIS3003 and a brazing material layer of JIS4045 or JIS4343 clad on its outside.

The radiator header 7 and condenser header 6 are simultaneously mounted using a temporary header holder and a header mounting device as will be described later. If a header includes a tank and a header plate or seat plate distinct and separated from each other, the header plate may be mounted first.

Figure 5:
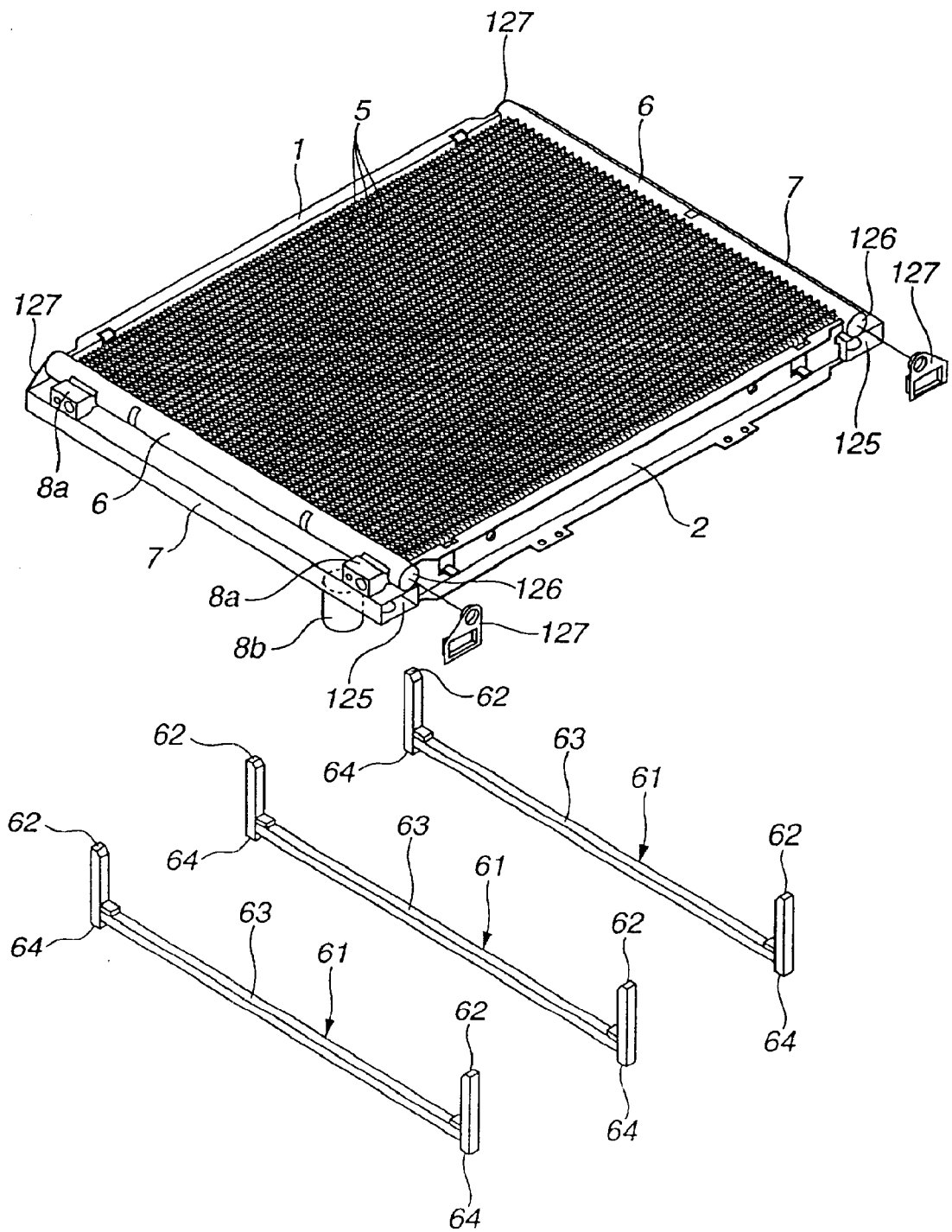
FIG. 5 is a view similar to FIG. 4, showing a baking jig mounting process.

Then, referring to FIG. 5, pipes and connectors 8a, 8b are mounted to the headers 6, 7. Header end covers 127 are mounted to close holes 125, 126 opened at both ends of the radiator header 7 and condenser header 6. One example of the header end cover 127 includes a core material of JIS3003 and a brazing material layer of JIS4045 or JIS4343 clad on the inside of the cover. The header end covers 127 are integrated with each other as a common cover for the radiator header 7 and condenser header 6. This results in greatly reduced number of parts in combination with commonality of the fins 5 and reinforces 1, 2.

Subsequently, with baking jigs 61 of a baking jig assembling device 33 as will be described later attached to the assembled heat exchanger, flux is applied to tube/fin connections, header/tube connections and connections of the other components, and then the heat exchanger made of aluminum is put in a furnace to braze those connections. The heat exchanger incorporating the radiator and condenser is completed through the above process.

Regarding flux application timing, for the devides and connectors to be provided in the condenser header 6, flux is applied when a condenser header subassembly is made. For inlet/outlet (I/O) pipes of the radiator, flux is applied when they are assembled or when it is applied to the header/tube connections. For the header end covers 127, flux is applied to the header/tube connections when they are assembled or when it is applied to header/tube bases.

B. Heat Exchanger Manufacturing System

The following explains the configuration of the heat exchanger manufacturing system for manufacturing the heat exchanger through the above process.

Figure 6:
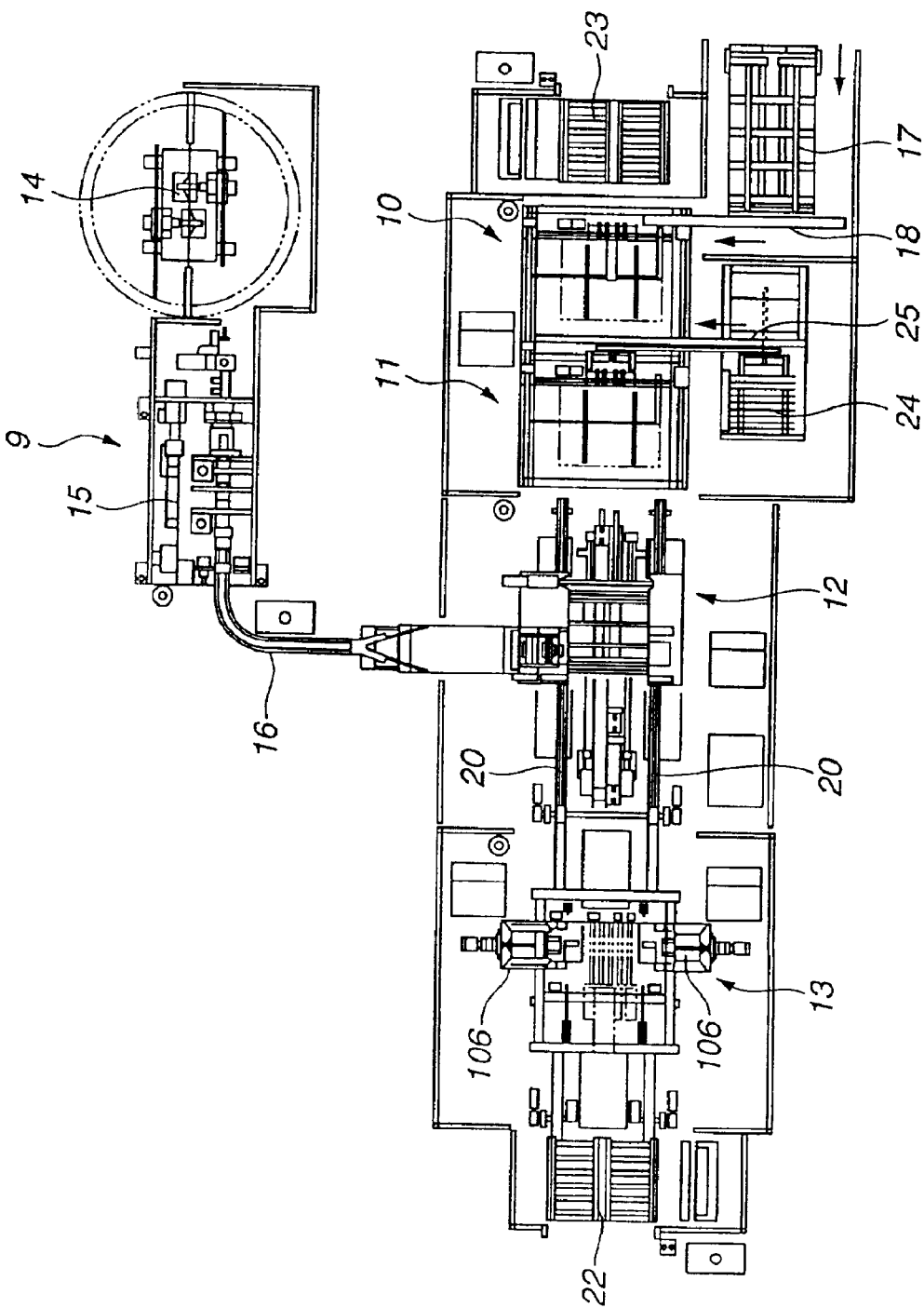
FIG. 6 is a plan view showing the general configuration of a system for manufacturing a heat exchanger.
Figure 7:
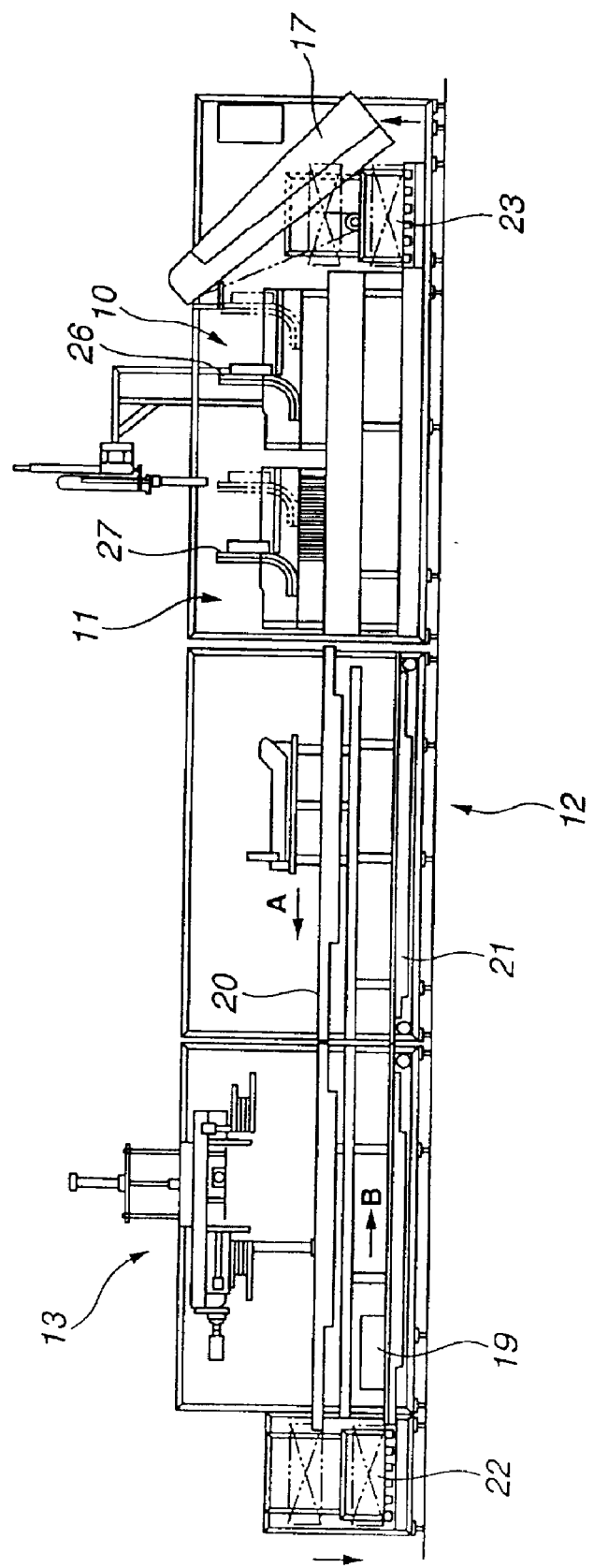
FIG. 7 is a front view showing the general configuration of the heat exchanger manufacturing system.

Referring to FIGS. 6–7, the heat exchanger manufacturing system comprises a fin forming part 9 for forming bellows-like fins 5 from a long aluminum sheet through some processes, a radiator tube arranging part 10 for arranging the radiator tubes 3, a condenser tube arranging part 11 for arranging the condenser tubes 4, a fin inserting part 12 for inserting the fins 5 into the space between the radiator tubes 3 and condenser tubes 4 arranged at a predetermined pitch, and a header mounting part 13 for mounting the radiator headers 7 and the condenser headers 6 to the tubes 3, 4.

The radiator tube arranging part 10, condenser tube arranging part 11, fin inserting part 12, and header mounting part 13 are disposed in line in that order, whereas the fin forming part 9 is disposed adjacent to that line.

B-1. Fin Forming Part

With the fin forming part 9, as shown in FIG. 6, an aluminum sheet wound in a roll and set on a coil stand 14 is fed to a fin forming machine 15 where it is formed in a bellows-like shape. Then, the continuously formed fin 5 is fed to the fin inserting part 12 through a fin feeding mechanism 16. When feeding to the fin inserting part 12, the continuously formed fin 5 is cut to a predetermined length.

B-2. Radiator Tube Arranging Part

With the radiator tube arranging part 10, as shown in FIG. 6, the radiator tubes 3 are transported at a predetermined pitch by a conveyor 17, which are then transported to a predetermined arranging portion by a tube loader 18, and are supplied one by one to a set base 30 of a platen 19 or assembling transporting table by a tube magazine 26 shown in FIG. 7. Here, the radiator tubes 3 are arranged at a predetermined pitch on the set base 30 of the platen 19.

As shown in FIG. 7, arranging the radiator tubes 3 is carried out by using a tube arranging device as will be described later disposed on the platen 19 which reciprocates between the radiator tube arranging part 10 and the header mounting part 13. The platen 19 is constructed to run on an upper rail 20 and a lower rail 21 as shown in FIG. 7. The platen 19 is moved from the radiator tube arranging part 10 to the header mounting part 13 in the direction of arrow A, and then lowered on the lower rail 21 by a platen lowering mechanism 22 disposed at a rear end of the header mounting part 13 as viewed in the feeding direction.

Then, the platen 19 is moved on the lower rail in the direction of arrow B to return to a position below the radiator tube arranging part 10. The platen 19 which has returned to its original position is lifted by a platen lifting mechanism 23 disposed before the radiator tube arranging part 10, and is placed again on the upper rail 20.

B-3. Condenser Tube Arranging Part

With the condenser tube arranging part 11, as shown in FIG. 6, the condenser tubes 4 are taken from a tube stocker 24 disposed beside the condenser tube arranging part 11 by the tube loader 25, and are transported to a predetermined arranging portion. Then, they are supplied one by one to the set base 30 of the platen 19 by a tube magazine 27 shown in FIG. 7. Here, the condenser tubes 4 are arranged just above the radiator tubes 3 arranged in the preceding process.

B-4. Fin Inserting Part

With the fin inserting part 12, as shown in FIG. 6, using a fin inserting device as will be described later, the fins 5 are inserted between the radiator tubes 3 and the condenser tubes 4 arranged on the set base 30 of the platen 19 at a predetermined spacing.

B-5. Header Mounting Part

With the header mounting part 13, as shown in FIG. 6, after applying compression to the fins 5 inserted between the radiator tubes 3 and the condenser tubes 4 to establish the arranging pitch to a predetermined value, the radiator headers 7 and condenser headers 6 are mounted to the tubes by using a header mounting device as will be described later.

C. Platen Configuration

The following explains the configuration of the platen 19 which moves on the upper rail 20 and lower rail 21. Referring to FIGS. 8–11, the platen 19 comprises a tube arranging device 31 for arranging the radiator tubes 3 and condenser tubes 4 at a predetermined pitch, a temporary header holder 32 for temporarily holding the radiator headers 7 and the condenser headers 6, and the baking jig assembling device 33 for assembling the baking jig or tie bar to the temporarily assembled heat exchanger.

The platen 19 comprises a main base 28 arranged on the upper rail 20 or the lower rail 21 and the set base 30 supported on the main base 28 by a plurality of support guides 66. Various parts forming the heat exchanger, such as reinforces 1, 2, tubes 3, 4, and headers 6, 7 to be provided at the stages of the radiator tube arranging part 10, condenser tube arranging part 11, fin inserting part 12, and header mounting part 13, are successively supplied to the set base 30 for assembling.

C-1. Tube Arranging Device

Figure 8:
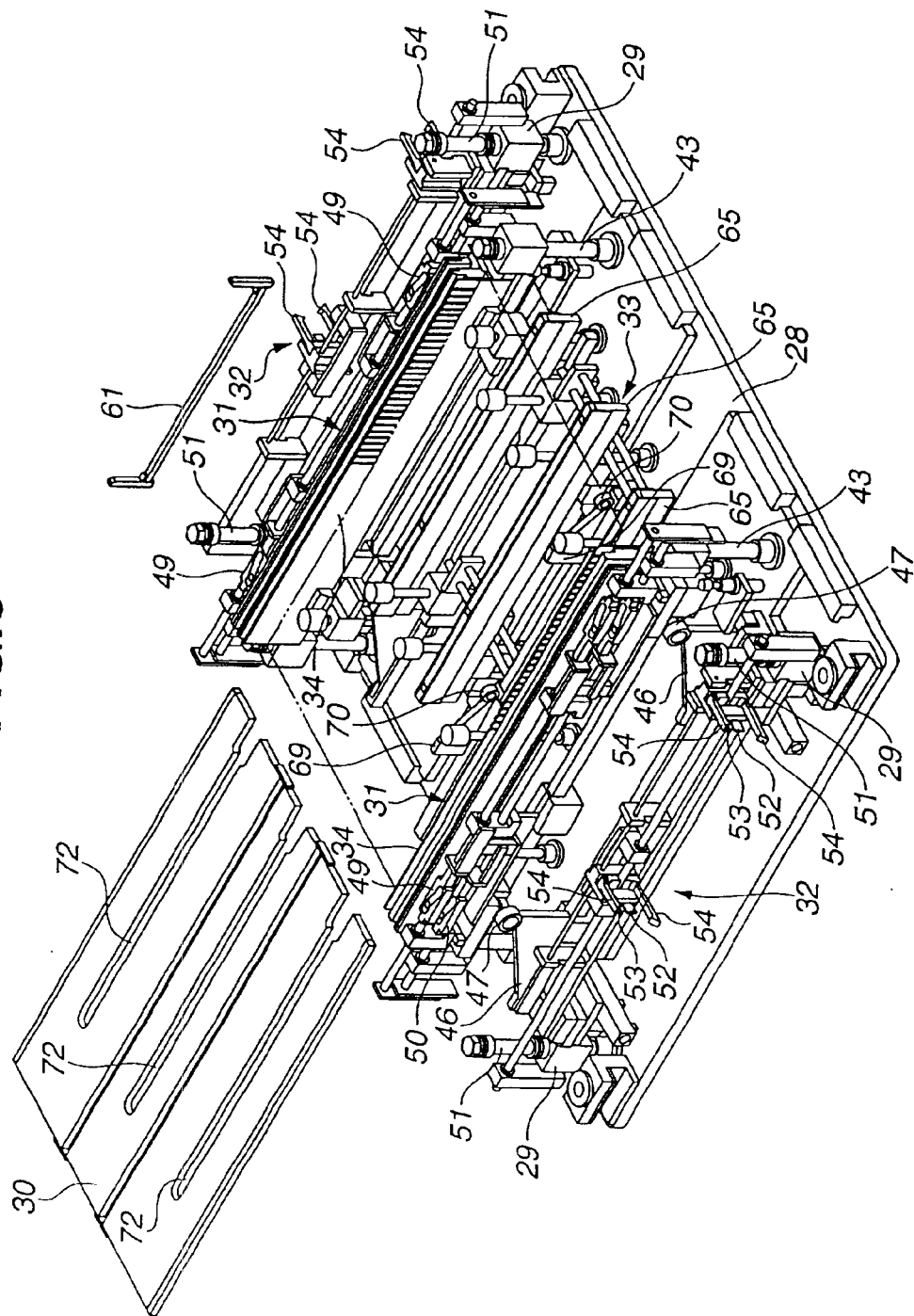
FIG. 8 is an exploded perspective view showing a platen.
Figure 9:
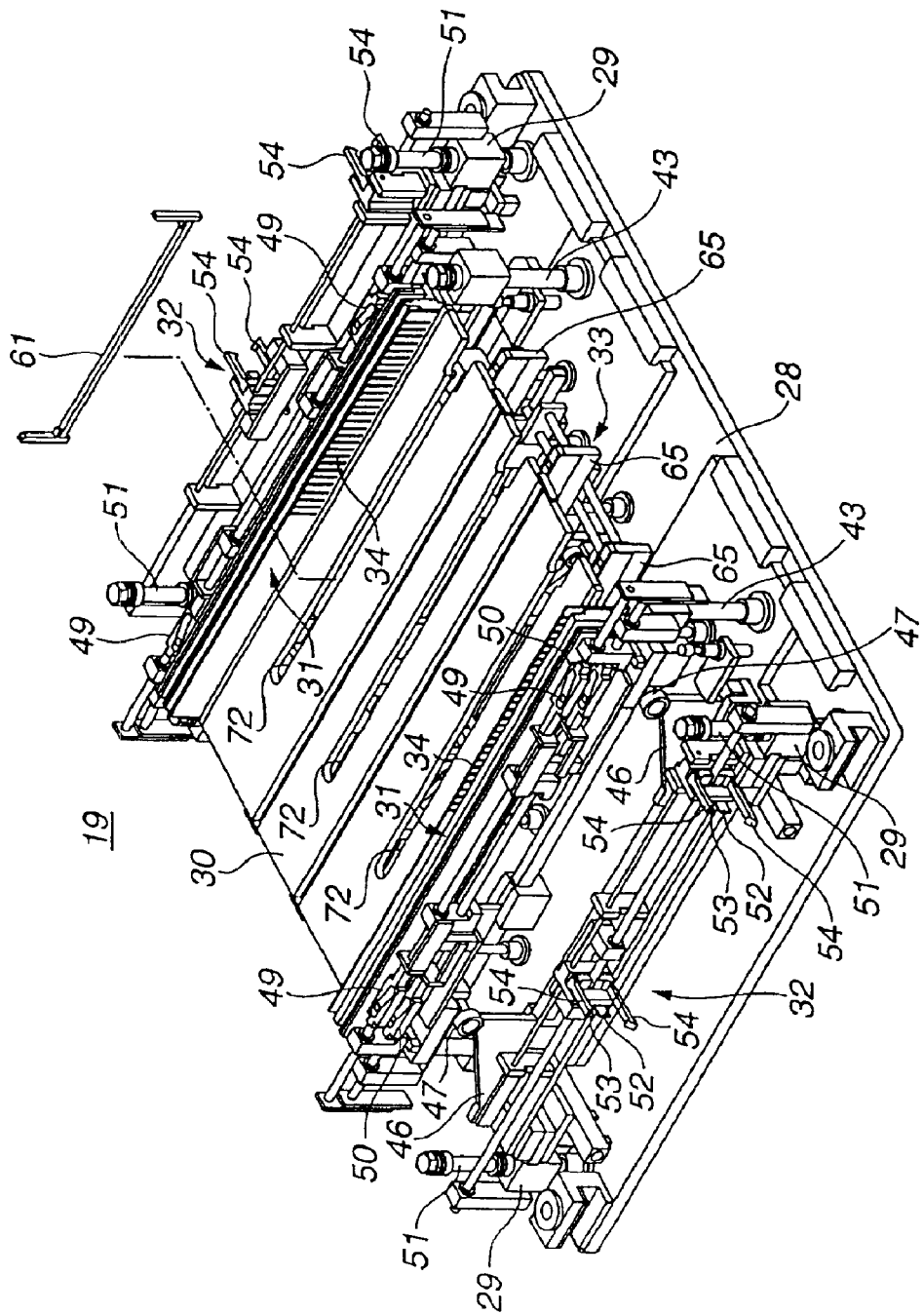
FIG. 9 is a view similar to FIG. 5, showing the platen.
Figure 10:
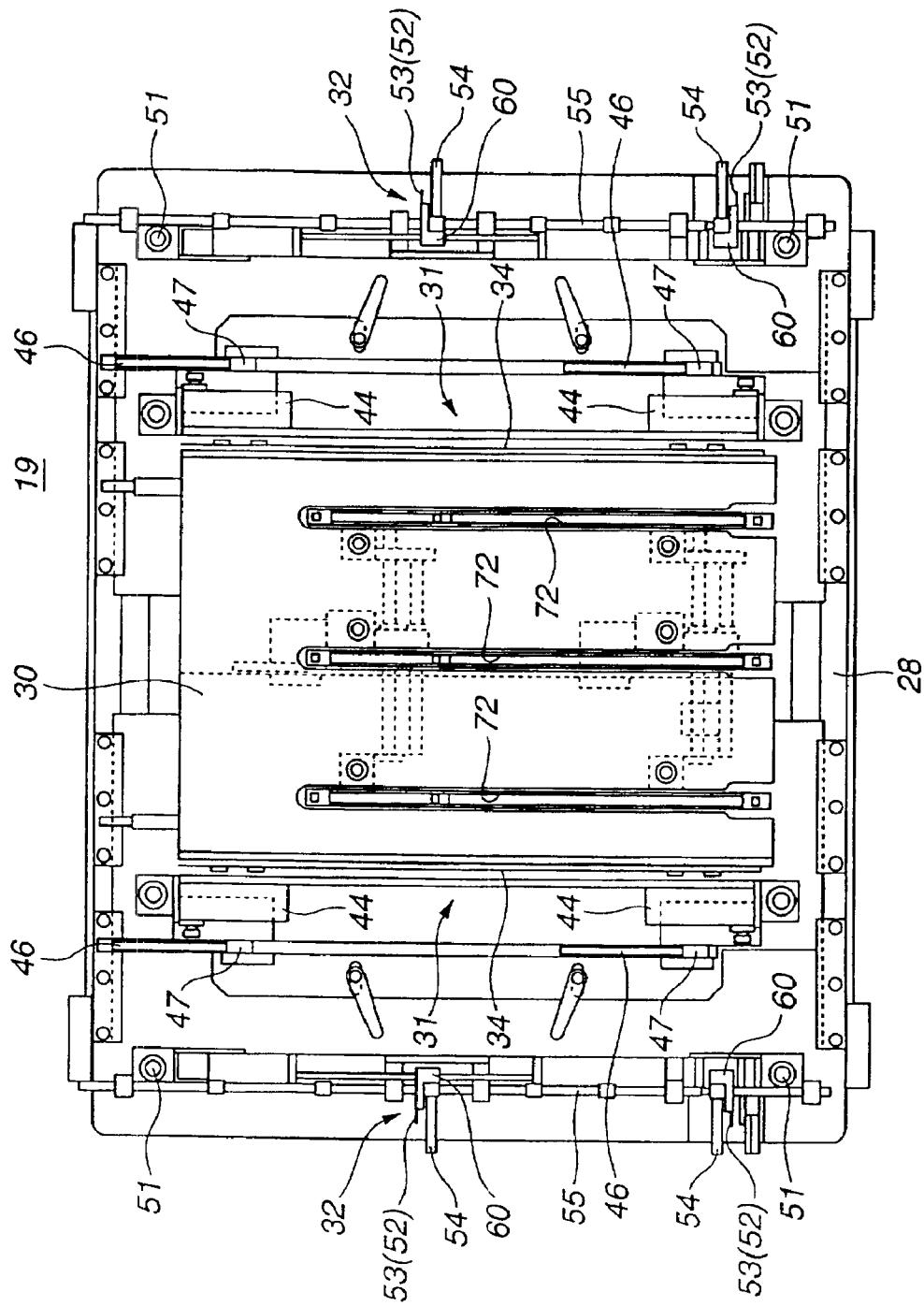
FIG. 10 is a view similar to FIG. 6, showing the platen.
Figure 11:
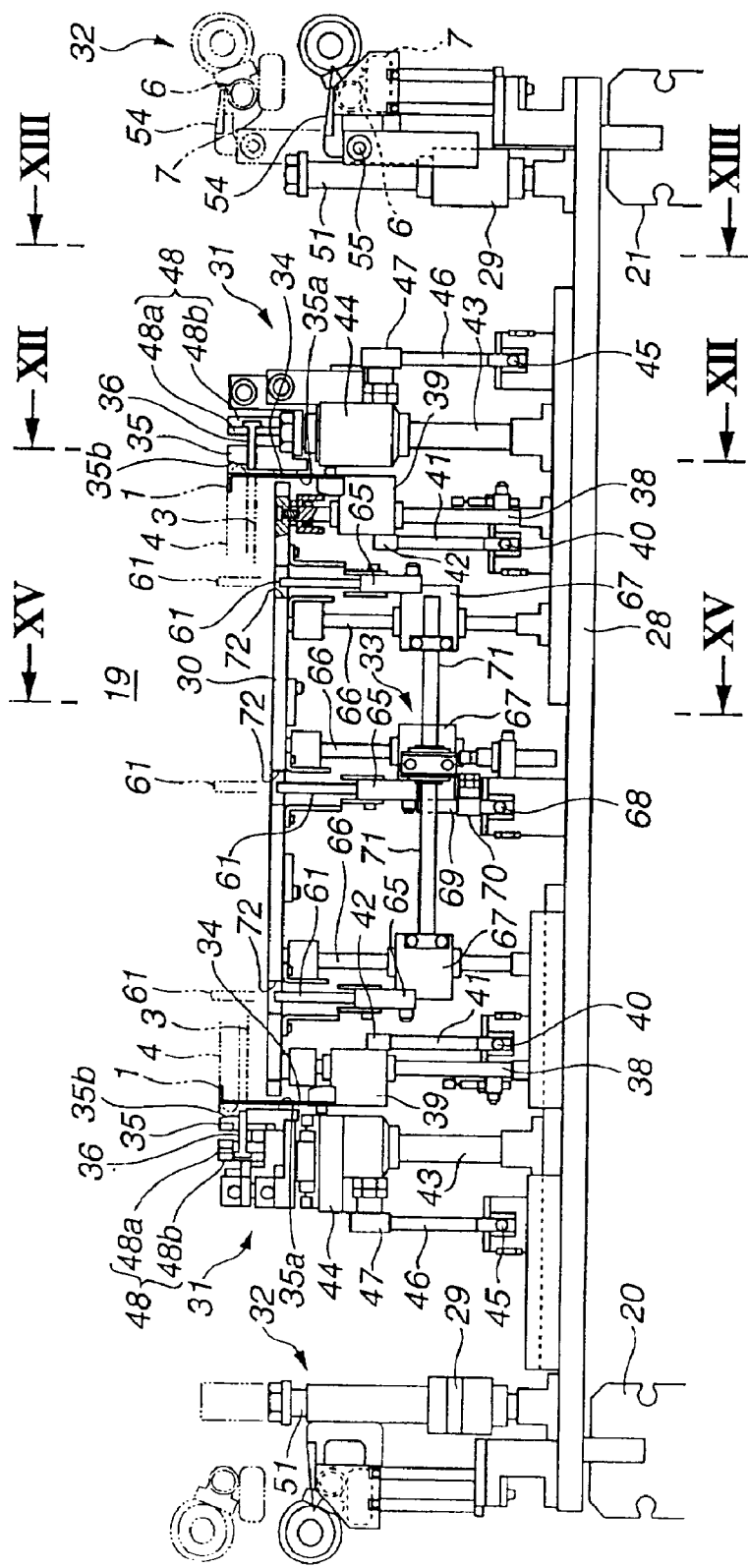
FIG. 11 is a view similar to FIG. 7, showing the platen.

As shown in FIGS. 8–9 and 11, the tube arranging device 31 comprises a comb-teeth-shaped positioning arranging member 34 for arranging the reinforces 1, 2, radiator tubes 3, and condenser tubes 4 at predetermined positions, an end-face restricting member 35 for restricting and aligning the positions of end faces of the reinforces 1, 2, radiator tubes 3, and condenser tubes 4, and a tube supporting member 36 for arranging the condenser tubes 4 just above the radiator tubes 3 with a predetermined distance therebetween.

C-1a. Positioning Member

Figure 12:
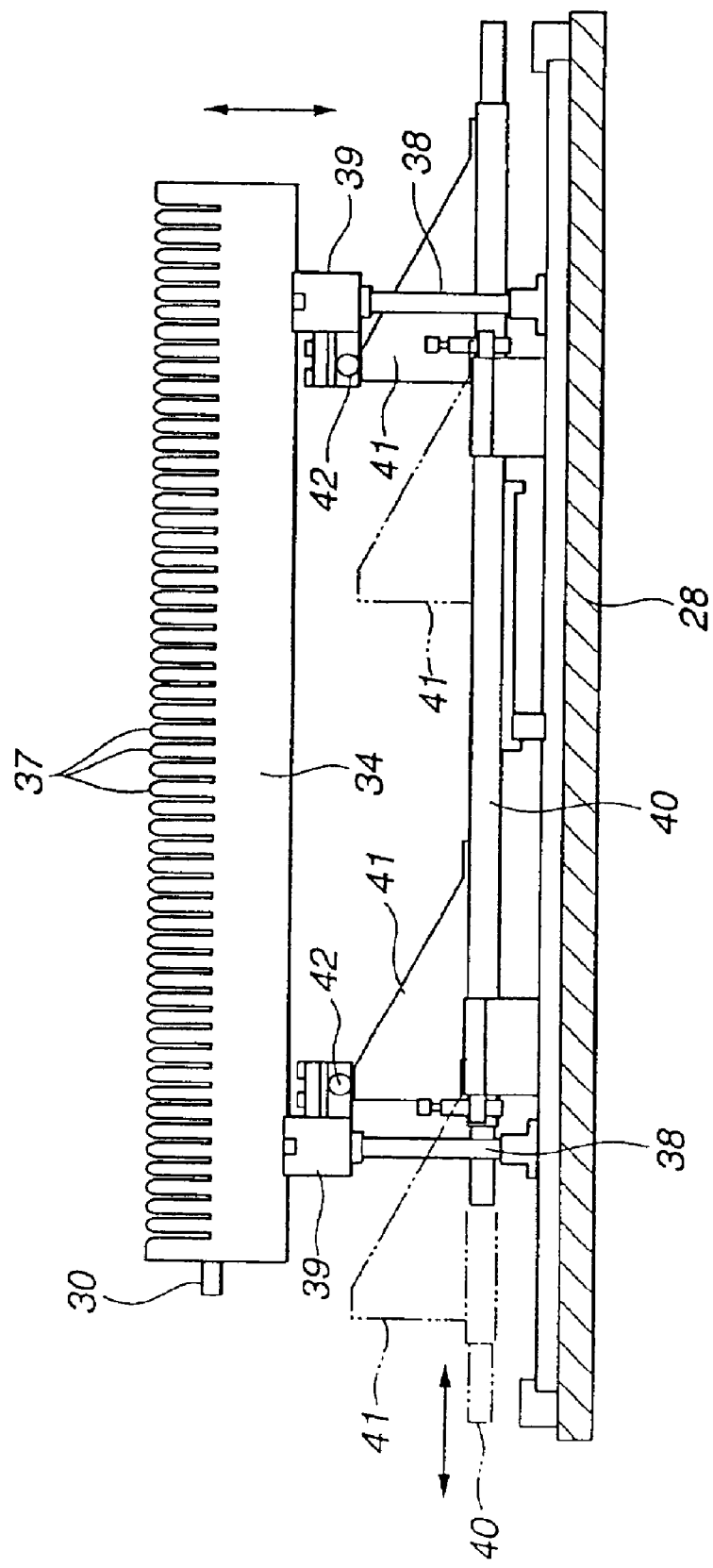
FIG. 12 is a view seen from arrows XII—XII in FIG. 11.

Referring to FIG. 12, the positioning arranging member 34 is formed in a comb-teeth shape having a plurality of slits 37 formed at a predetermined pitch along the longitudinal direction. The slits 37 are formed as notches perpendicularly downward cut from the upper end edge so as to serve to receive and position the reinforces 1, 2, radiator tubes 3, and condenser tubes 4 at the portions close to both ends. The slits 37 have such length that the radiator tube 3 and condenser tube 4 can be inserted in the same slit with a predetermined distance therebetween.

As shown in FIGS. 11–12, the positioning arranging member 34 is fixed to lifting blocks 39 which are movable along a pair of support guides 38, 38 erectly arranged on the main base 28. The lifting block 39 is provided with a cam follower 42 slidably engaged with a roughly triangular cam 41 fixed to a slider 40 slidably mounted on the main base 28. Therefore, when the slider 40 is at the position shown by solid line in FIG. 12, the positioning arranging member 34 is at an upper end position projected from the top surface of the set base 30. When the slider 40 moves to a left position shown in two-dot chain line in FIG. 12, the positioning arranging member 34 is moved to a bottom dead center position below the set base 30 through the cam 41.

Specifically, referring to FIGS. 16A–16C, the positioning arranging member 34 is moved up and down so that it is disposed at a position above the set base 30 when assembling the reinforces 1, 2, radiator tubes 3, and condenser tubes 4, and it is disposed at a position below the set base 30 when compressing the temporarily assembled heat exchanger.

C-1b. End Face Restricting Member

As shown in FIGS. 11 and 16A–16C, the end face restricting member 35 is formed as a rectangular block facing the positioning arranging member 34. The end face restricting member 35 has a stepped portion formed on the surface facing the positioning arranging member 34, and includes a front end face 35a serving as a radiator tube position restricting face for restricting the position of a longitudinal end of the radiator tubes 3 and a rear end face 35b serving as a condenser tube position restricting face for restricting the position of a longitudinal end of the condenser tubes 4.

Figure 13:
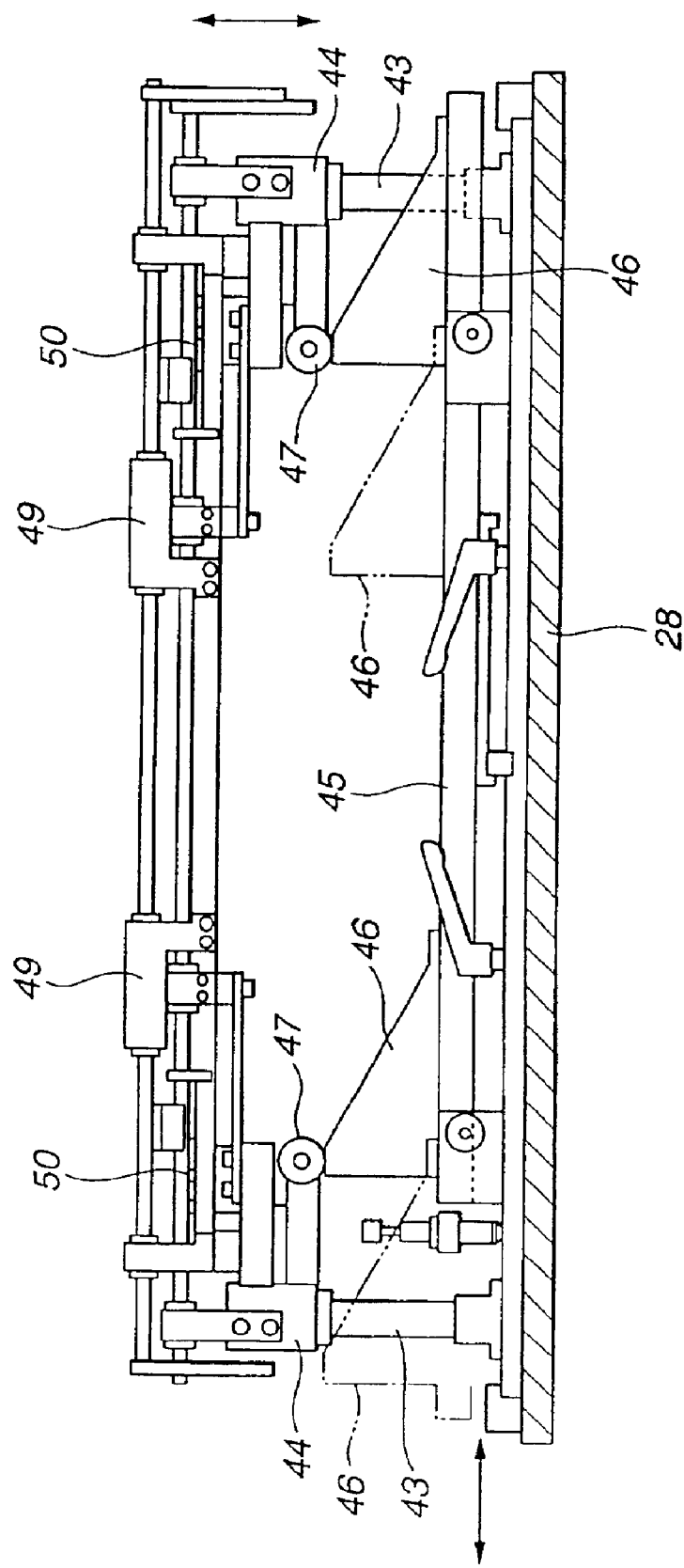
FIG. 13 is a view similar to FIG. 12, seen from arrows XIII—XIII in FIG. 11.

As shown in FIGS. 11 and 13, the end face restricting member 35 is fixed to the lifting block 44 which is movable along a pair of support guides 43, 43 erectly arranged on the main base 28. The lifting block 44 is provided with the cam follower 47 slidably engaged with a roughly triangular cam 46 fixed to a slider 45 slidably mounted on the main base 28. Therefore, when the slider 45 is at the position shown by solid line in FIG. 13, the end face restricting member 35 is at an upper end position projected from the top surface of the set base 30. When the slider 45 moves to the left position shown by broken line in FIG. 13, the end face restricting member 35 is moved to a bottom dead center position below the set base 30 through the cam 46.

Figure 16A:
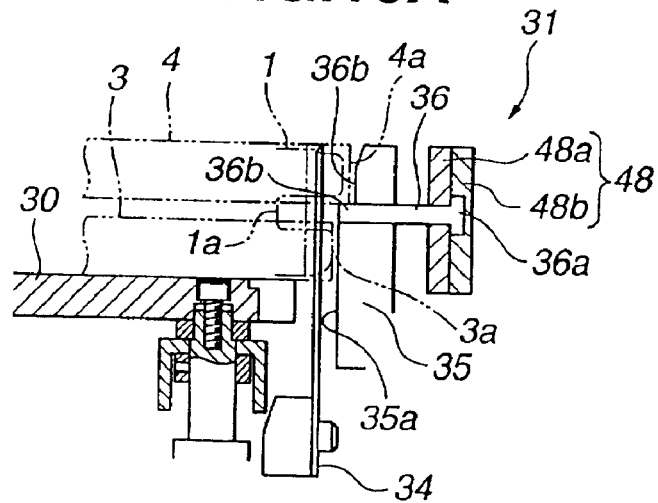
FIGS. 16A–16C are fragmentary enlarged front views, each showing a radiator tube and condenser tube arranging/end face positioning process.
Figure 16B:
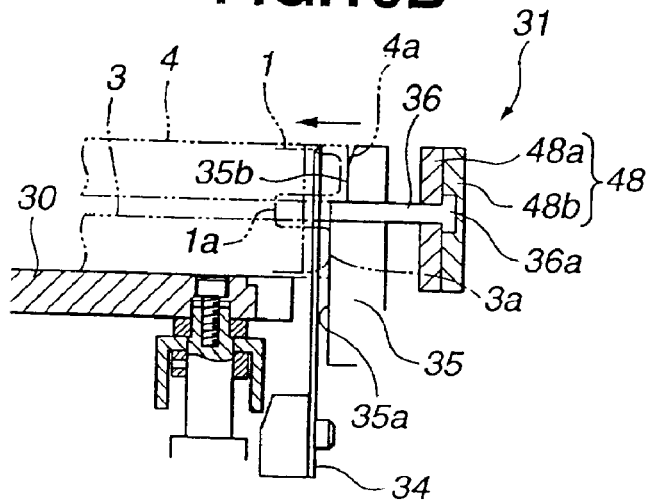
Figure 16C:
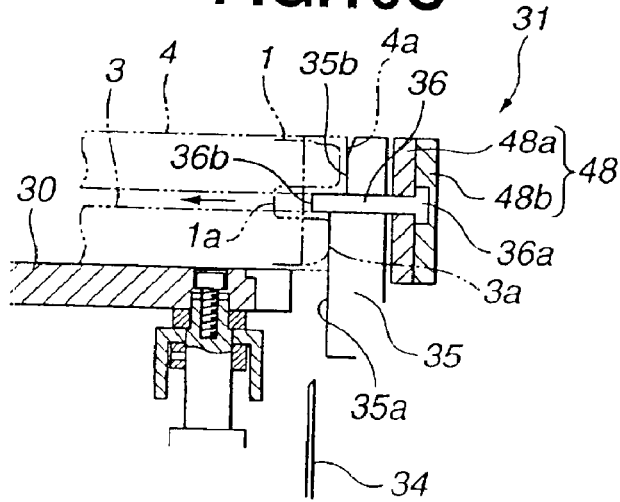

Specifically, as shown in FIGS. 16A–16C, the end face restricting member 35 is moved up and down so that it is disposed at a position above the set base 30 when assembling the reinforces 1, 2, radiator tubes 3, and condenser tubes 4, and it is disposed at a position below the set base 30 when mounting the radiator headers 7 and condenser headers 6 to the temporarily assembled heat exchanger.

C-1c. Tube Supporting Member

As shown in FIGS. 11 and FIGS. 16A–16C, the tube supporting member 36 is formed as a rectangular flat plate having substantially same length as that of the end face restricting member 35, and is fixed to a tube supporting member holding plate 48 disposed on the lifting block 44. As shown in FIGS. 16A–16C, the tube supporting member 36 includes a collar portion at a base end 36a, and is held roughly horizontally by holding the collar portion between a pair of tube supporting member holding plates 48a, 48b.

On the other hand, a tip portion 36b of the tube supporting member 36 is disposed on a stepped face through a through hole formed in the end face restricting member 35. An end portion of the condenser tubes 4 is placed on a projection provided on the stepped face. The thickness of the tube supporting member 36 determines a predetermined distance between the radiator tubes 3 and the condenser tubes 4. An end of the tip portion 36b of the tube supporting member 36 abuts on the fins 5 inserted between tubes so as to serves to compress the fins 5 when compressing the temporarily assembled heat exchanger.

The tube supporting member 36 is moved up and down through the cam 46 in the same way as the end face restricting member 35. Here, the end face restricting members 35 and the tube supporting members 36 in their entirety move up and down along the support guides 43. Referring to FIGS. 14A–14B, the end face restricting member 35 and the tube supporting member 36 are horizontally movable in the direction of approaching and separating from the positioning arranging member 34 by means of cam drive mechanisms 49, 50. The cam drive mechanism 49 shown in FIG. 14A is a mechanism part for horizontally moving the tube supporting member 36, whereas the cam drive mechanism 50 shown in FIG. 14B is a mechanism part for horizontally moving the end face restricting member 35.

C-2. Temporary Header Holder

Figure 17:
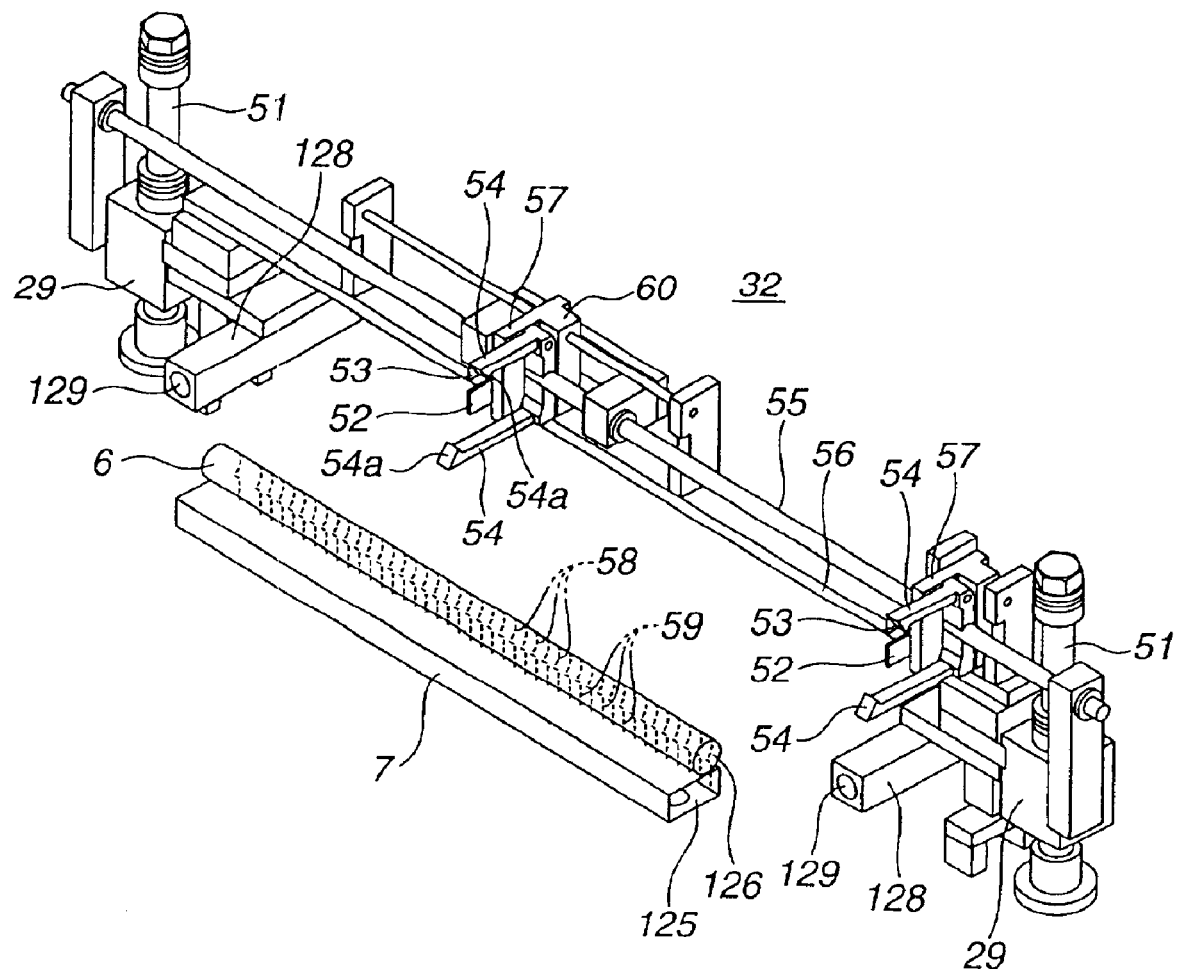
FIG. 17 is a fragmentary enlarged perspective view showing a temporary header holder.
Figure 18:
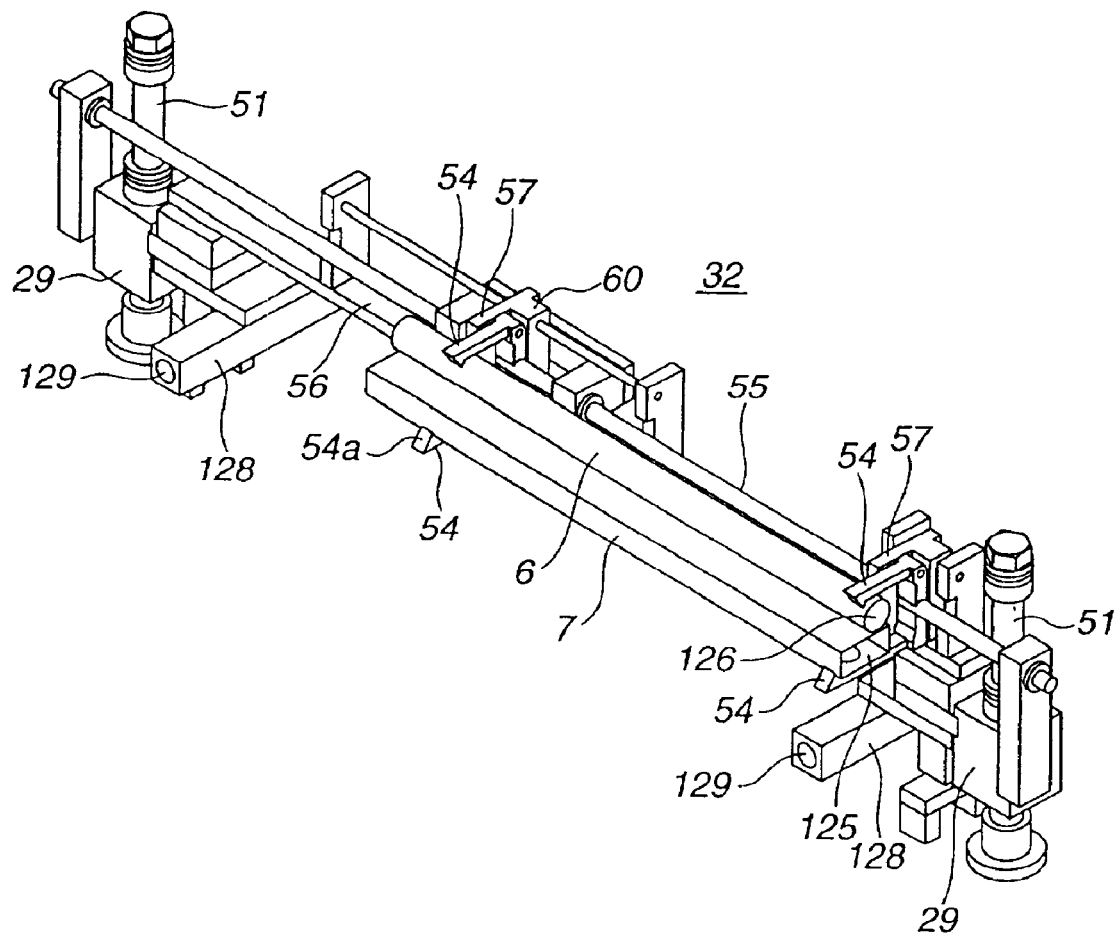
FIG. 18 is a view similar to FIG. 17, showing the radiator tube and condenser tube temporarily held by the temporary header holder.

Referring to FIGS. 9 and 17–18, the temporary header holder 32 is provided on both sides of the main base 28 away from the set base. As shown in FIG. 17, the temporary header holder 32 comprises radiator header positioning claws 52 for temporarily holding the radiator headers 7, condenser header positioning claws 53 for temporarily holding the condenser headers 6, and a pair of clampers 54, 54 for holding the radiator headers 7 and condenser headers 6.

The radiator header positioning claws 52 and condenser header positioning claw 53 are mounted to a shaft 55 fixed to lifting blocks 29 which are movable along a pair of support guides 51, 51 erectly arranged on the main base 28. The shaft 55 is supported by a shaft supporting member 56 fixed on the lifting blocks 29 so as not to suffer flexure when temporarily holding the radiator header 7 and condenser header 6. The radiator header positioning claws 52 and condenser header positioning claws 53 are fixed to common claw holding members 57 fixed to the shaft 55 with a predetermined vertical spacing therebetween. Referring to FIG. 17, the condenser header positioning claws 53 are arranged at an upper position, and the radiator header positioning claws 52 are arranged at a lower position, wherein the condenser header positioning claws 53 and the radiator header positioning claws 52 are slightly smaller in section than the corresponding tubes to allow secure holding thereof.

As shown in FIGS. 17–18, the radiator header positioning claws 52 are inserted into slits 59 (see FIG. 3) formed in the radiator header 7 with rectangular section for receiving the end portion of the radiator tubes 3, and temporarily hold the radiator header 7. The condenser header positioning claws 53 are inserted into slits 58 formed in the cylindrical condenser header 6 for receiving the end portion of the condenser tubes 4, and temporarily hold the condenser header 6.

The clampers 54, 54 have a base end rotatably mounted to a clamper mounting member 60 fixed to the shaft supporting member 56, thus making an end movable. As shown in FIG. 18, the lower clamper 54 supports the radiator header 7 from below, and carries it with a catching claw 54a formed at its end. The upper clamper 54 holds the condenser header 6 from above, and carries the condenser header 6 with a catching claw 54a formed at its end. Specifically, the upper and lower clampers 54, 54 simultaneously hold the radiator header 7 and condenser header 6 from above and below, maintaining temporary holding of the headers 6, 7.

The temporary header holder 32 in its entirety is moved up and down with respect to the main base 28 by a lifting means, not illustrated. The lifting means moves up and down the temporary header holder 32 in its entirety with lifting pins, not illustrated, provided on the header mounting part 13 being inserted into pin inserting holes 129 of blocks 128 disposed on the temporary header holder 32. Referring to FIG. 11, the position shown by solid line is an origin position which corresponds to a standby position where the radiator header 7 and condenser header 6 are below the height position of the set base 30. The position shown by broken line is an upper end position which corresponds to a tank set position where the temporary header holder 32 in its entirety is raised to roughly the same height as that of the set base 30 in the header mounting part 13.

C-3. Baking Jig Assembling Device

Figure 15:
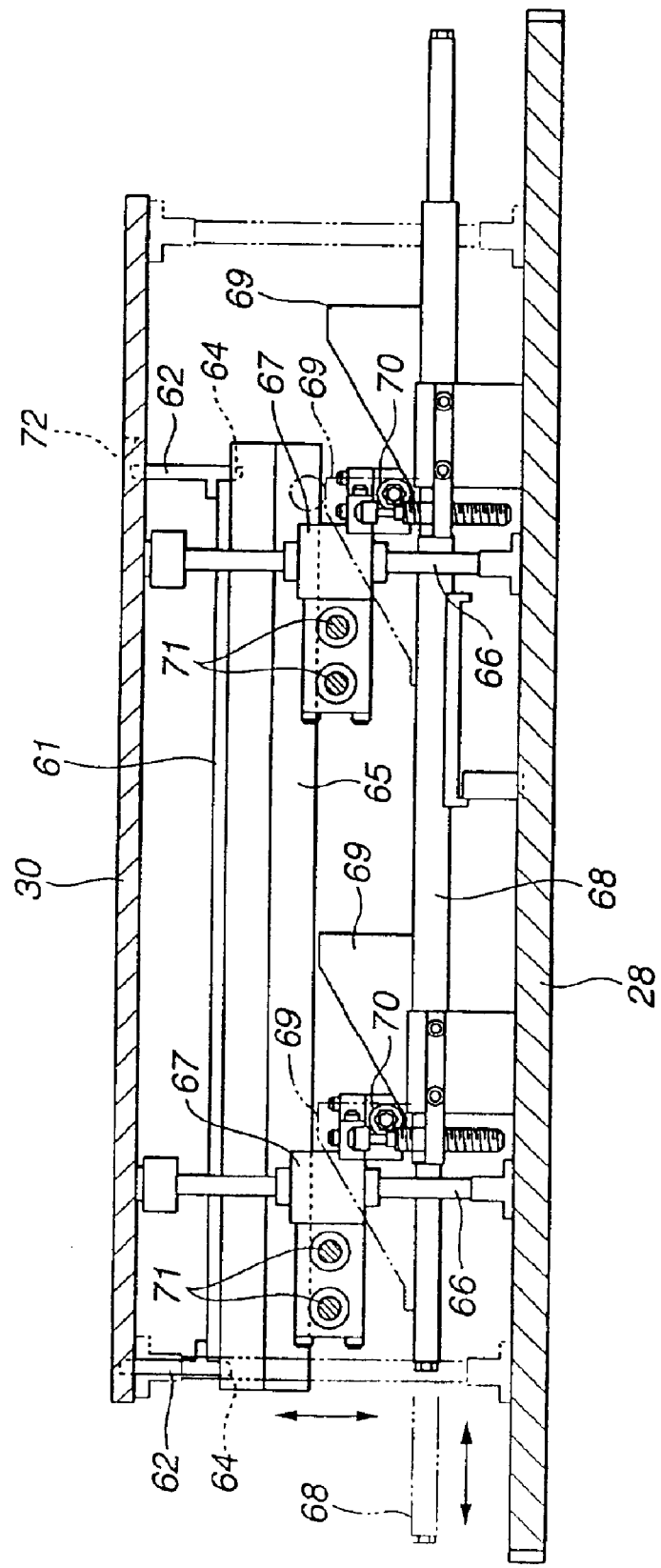
FIG. 15 is a view similar to FIG. 13, seen from arrows XV—XV in FIG. 11.

As shown in FIGS. 11 and 15, the baking jig assembling device 33 comprises baking jigs 61 mounted to the temporarily assembled heat exchanger, and a drive mechanism part for keeping the baking jigs 61 on standby at a lower position below the set base 30 before completing temporary assembling of the heat exchanger and for raising the baking jigs 61 to a position projected from the set base 30 after completing temporary assembling.

C-3a. Baking Jig

As shown in FIG. 5, the baking jig 61 is mounted to the temporarily assembled heat exchanger in the tube arranging direction so as to serve as a receiver base for supporting the heat exchanger when it is set in the furnace. The baking jig 61 comprises a pair of guides 62, 62 abutting on the reinforces 1, 2 arranged vertically, a connection 63 connected between the guides 62, 62, and legs 64 protruding downward from the connection 63.

Since the baking jig 61 being mounted to the heat exchanger is inserted and heated in the furnace, it is made of metallic material having heat resistance. In the furnace, the heat exchanger is held to have its underside raised by the legs 64 so as to provide to the underside heat in the furnace.

C-3b. Drive Mechanism Part

As shown in FIGS. 11 and 15, the drive mechanism part comprises jig holders 65 for holding three baking jigs 61, lifting blocks 67 which are movable along three sets of pair of support guides 66 erectly arranged on the main base 28, roughly triangular cams 69 fixed to a slider 68 for moving up and down the jig holders 65, cam followers 70 slidably engaged with the cams 69, and a pair of connecting shafts 71, 71 for connecting the lifting blocks 67 which fix the jig holders 65 for supporting the three baking jigs 61.

The jig holder 65 is formed as a rectangular holding plate to erectly hold the guide 62 by receiving the leg 64 of the baking jig 61. The jig holder 65 is fixed to the lifting blocks 67 movably mounted to the support guides 66, 66. The slider 68 is slidably disposed on the main base 28 to be movable to the position shown by broken line in FIG. 12.

Referring to FIG. 15, the cam 69 is moved by the slider 68 from the position shown by solid line to the position shown by broken line to travel the cam follower 70 between a lower end position and an upper end position of a cam inclination, thus moving up and down the jig holder 65. When the slider 68 is at the position shown by broken line in FIG. 15, the jig holder 65 is at its origin position or bottom dead center wherein the baking jig 61 is on standby at a position below the set base 30.

On the other hand, when the slider 68 is at the position shown by broken line in FIG. 15, the jig holder 65 is at an upper end position as shown in FIG. 11, wherein the baking jig 61 protrudes upward from a baking jig lifting opening 72 (see FIG. 9) formed in the set base 30. Specifically, at the upper end position, the connection 63 of the baking jig 61 is located at the top surface of the set base 30, and the guide portion 62 protrudes upward from the top surface of the set base 30.

Thus, with the tubes 3, 4 and the fins 5 still compressed after completing temporary assembling of the tubes 3, 4 with headers 6, 7 attached, the baking jigs 61 are raised and automatically mounted to the heat exchanger on the set base 30. When moving up and down the baking jigs 61, the three baking jigs 61 are simultaneously mounted to the heat exchanger through the connecting shafts 71, achieving mounting of the three without any variation.

D. Fin Inserting Device

The following explains the fin inserting device. The fin inserting device, disposed in the fin inserting part 12, is a device for inserting common fins 5 for radiator and condenser in the spaces between the radiator tubes 3 and the condenser tubes 4 arranged at a predetermined interval.

Figure 19:
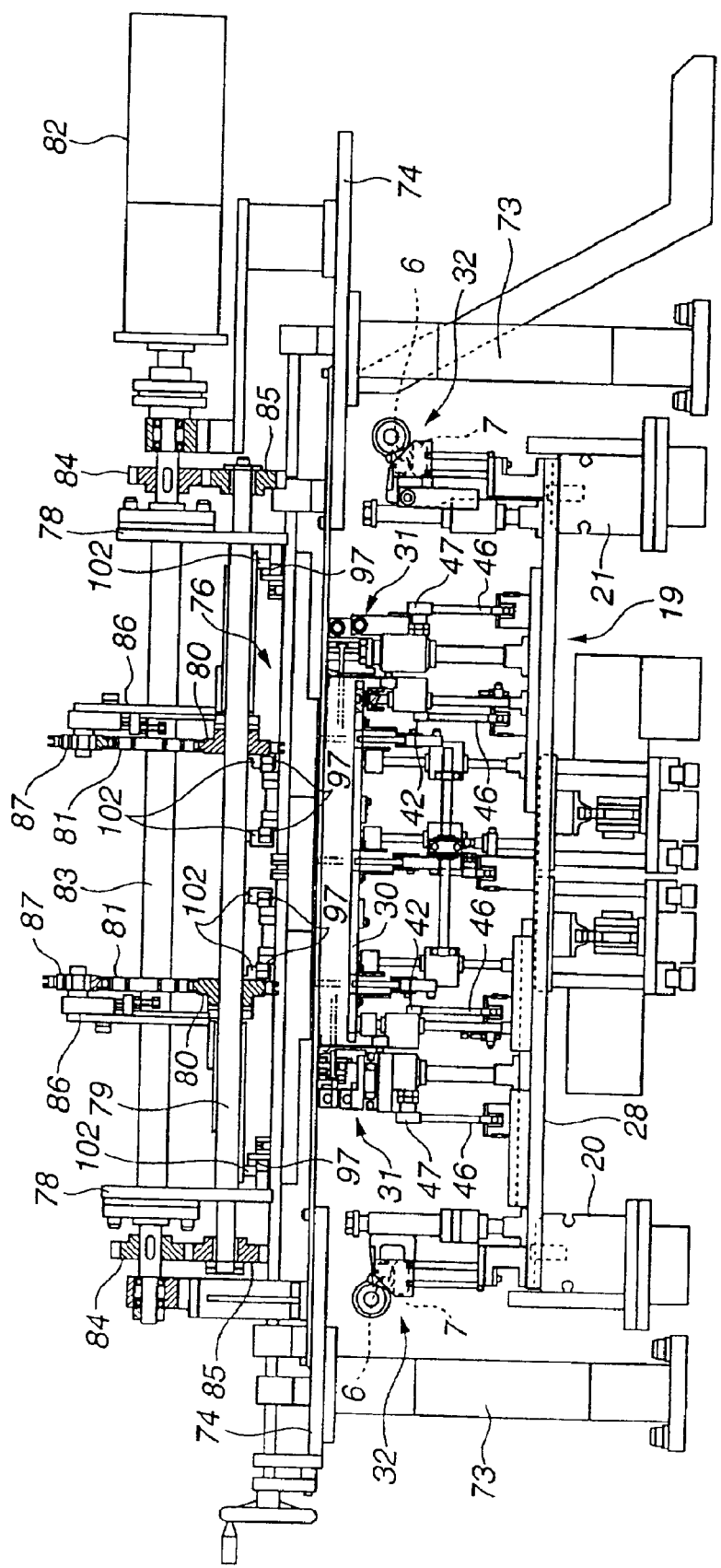
FIG. 19 is a view similar to FIG. 11, showing a fin inserting device.
Figure 20:
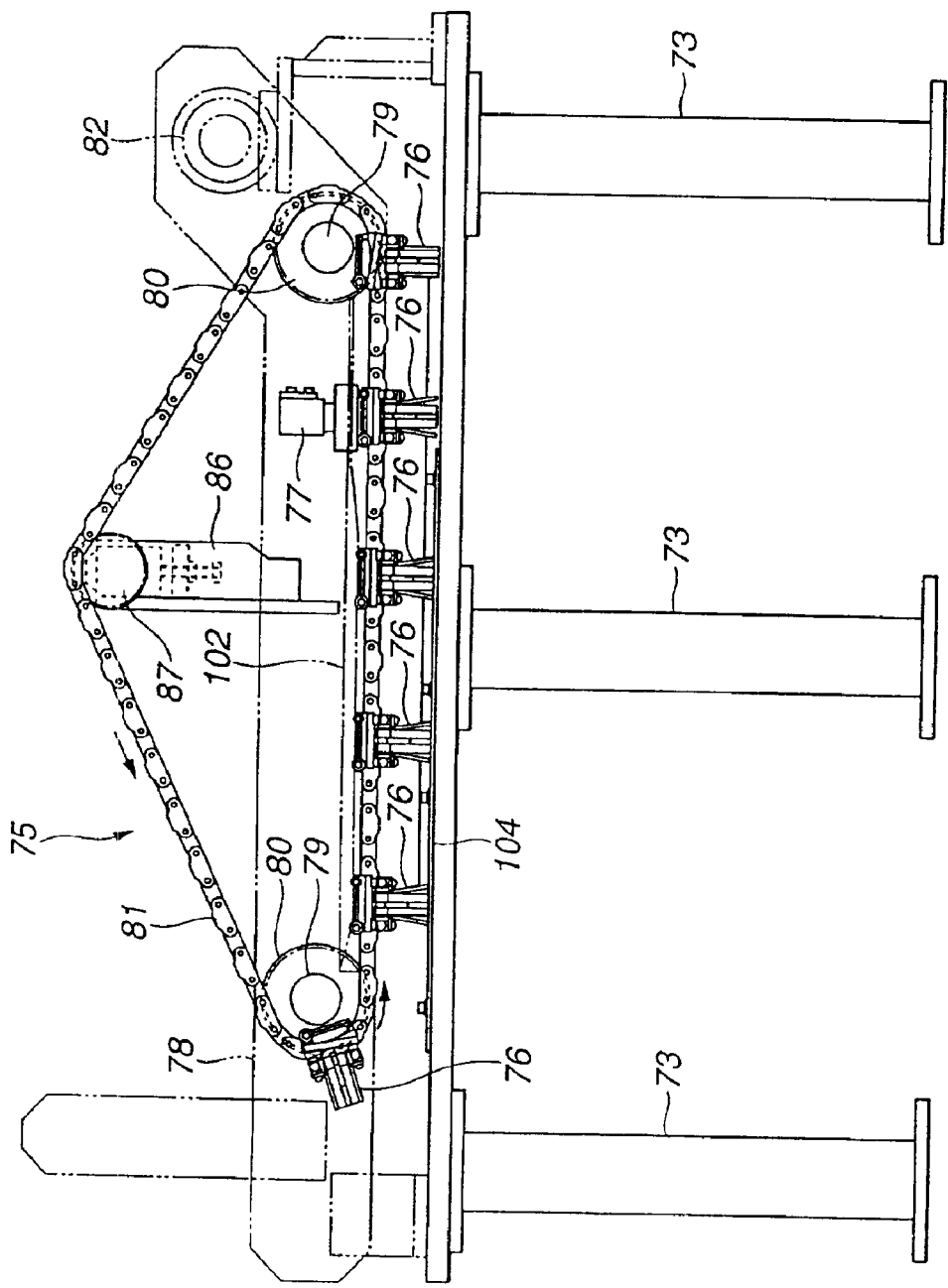
FIG. 20 is a side view showing the fin inserting device.

Referring to FIGS. 19–20, the fin inserting device comprises a conveyor 75 or carrying apparatus disposed on a frame 74 supported by a plurality of supports 73, fin holding members 76 mounted to the conveyor 75 for receiving at a fin receiving position the fins 5 formed at the fin forming part 9 and transporting them to a fin dropping position (see FIG. 21), and a fin inserting member 77 for dropping and inserting the fins 5 between the tubes 3, 4 at the fin dropping position.

D-1. Conveyor

As shown in FIGS. 19–20, the conveyor 75 is disposed between a pair of support frames 78, 78 disposed on the frame 74, and comprises a pair of chain driving shafts 79, 79 mounted rotatably, a chain 81 interconnecting between sprockets 80 fixed to the chain driving shafts 79, 79, a drive motor 82 or drive mechanism for driving the chain 81, a drive shaft 83, and a drive gear 84.

As shown in FIG. 19, the chain driving shafts 79, 79 are disposed between the support frames 78, 78 at the same height and with a predetermined spacing therebetween, having both ends rotatably supported by bearings mounted to the support frames 78, 78. Fixed to one end of one of the chain driving shafts 79, 79 is a driven gear 85 meshed with the drive gear 84 fixed to the drive shaft 83.

When rotation of the drive gear 84 fixed to the drive shaft 83 for transmitting rotation of the drive motor 82 is transmitted to the driven gear 85 so as to rotate the chain driving shafts 79, the chain 8 is rotated in the direction of arrow in FIG. 20. At that time, the chain 81 runs in a roughly triangular shape through the upper sprocket 87 rotatably mounted to a sprocket mounting member 86 located above and between a pair of chain driving shafts 79, 79. The chain 81 is moved stepwise by means of the drive motor 82.

D-2. Fin Holding Member

Referring to FIGS. 23A–24B, the fin holding members 76 are mounted to the chain 81 at intervals for allowing stepwise movement at a predetermined pitch between the fin receiving position for receiving the fins 5 formed at the fin forming part 9 and the fin dropping position (see FIG. 21) for dropping the fins 5 between tubes. Referring to FIGS. 22–24B, the fin holding member 76 comprises a main body frame 88, a fin guide holding plate 89 fixed to the main body frame 88, fin clamp plates 90, 91, 92 for holding the fin guide holding plate 89 in the center position and allowing opening/closing on both sides, and a cam drive mechanism part 93 for rotating the fin clamp plates 90, 91, 92.

D-2a. Main Body Frame

As shown in FIGS. 23A–24B, the main body frame 88 is formed as a plate longer than at least the fin 5. Slot-shaped air introducing holes 94 are formed in the main body frame 88 at substantially the center and the positions close to both sides. Air out of an air supply unit, not illustrated, is blown into the air introducing holes 94 to insert inward the fin 5 held between the central fin guide holding plate 89 and the fin clamp plates 90, 91, 92.

Figure 26:
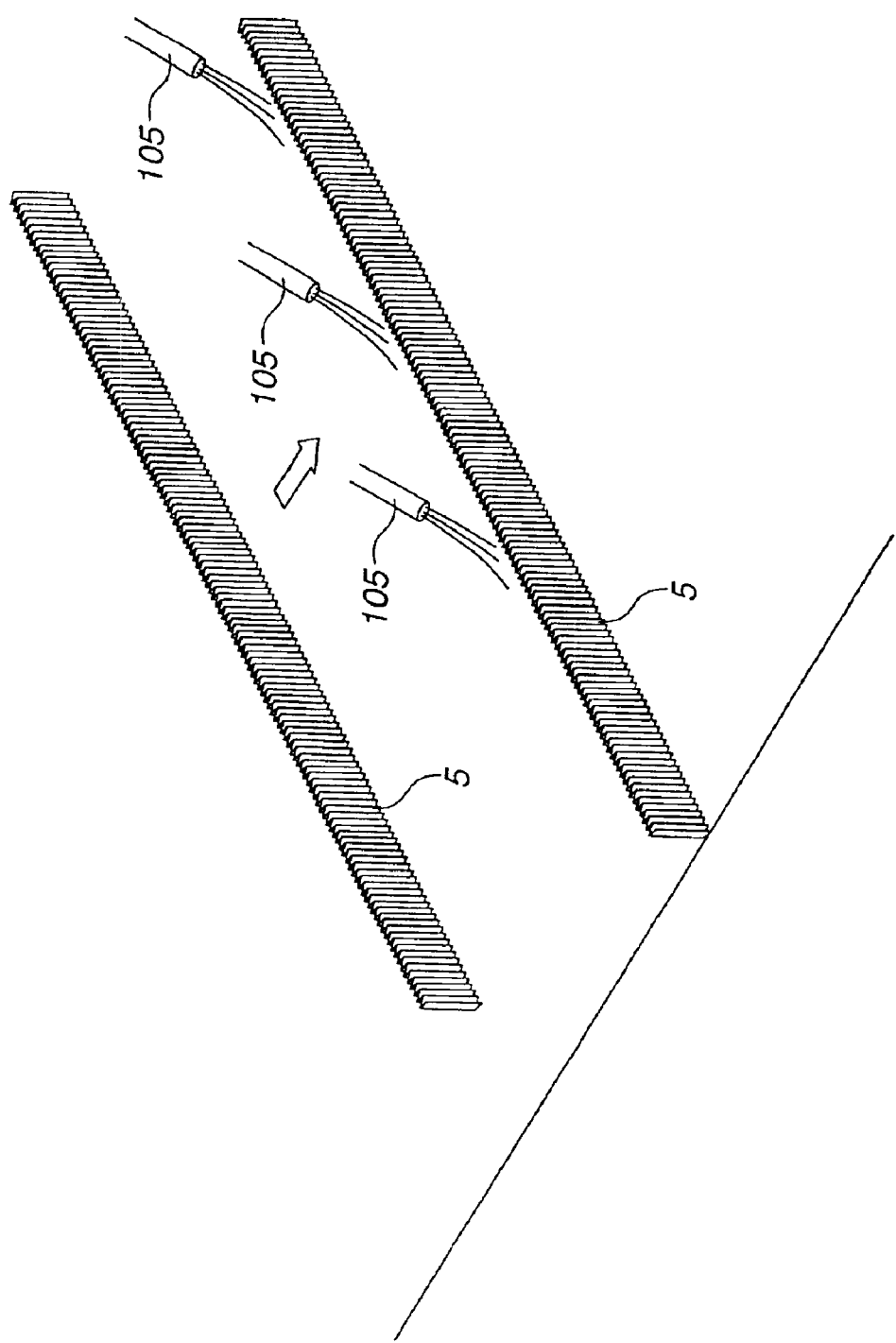
FIG. 26 is a view similar to FIG. 22, showing an air blow fin moving process in a fin inserting part.

Referring to FIG. 26, the bellows-shaped fin 5 fed from the fin forming part 9 is moved inward of the fin holding member 76 by blowing air toward a longitudinal tip of the fin 5 through air blow nozzles 105 arranged at the tip, the center, and a rear end.

D-2b. Fin Guide Holding Plate

As shown in FIGS. 23A–24B, the fin guide holding plate 89 is formed as a plate having roughly the same length as that of the main body frame 88. The fin guide holding plate 89 is fixed to the main body frame 88 at its substantially center position by bolts 95 to be substantially perpendicular to the main body frame 88. Specifically, the whole of the fin guide holding plate 89 mounted to the main body frame 88 provides a roughly T-shape.

D-2c. Fin Clamp Plate

As shown in FIG. 23A–24B, the fin clamp plates 90, 91, 92 include plates with roughly L-shaped cross section having spaces for receiving and holding the fins 5 between the fin clamp plates and the fin guide holding plate 89, and they are movably mounted to the main body frame 88. The fin clamp plates 90, 91, 92 are provided to the main body frame 88 at the longitudinal center and both sides, respectively. The side fin clamp plates 90, 92 include a portion having substantially the same length as that of the center fin clamp plate 91, i.e. perpendicular length thereof shown in FIG. 24A, and a portion having substantially half length. When changing the viewpoint, the fin clamp plates 90, 92 have a shape with both sides cut.

D-2d. Cam Drive Mechanism Part

As shown in FIGS. 23A–24B, the cam drive mechanism part 93 comprises a pair of cam follower mounting plates 96, 96 having one end fixed to the side fin clamp plates 90, 92, cam followers 97 mounted to the cam follower mounting plates 96, and a helical tension spring 99 provided between spring engagements 98 arranged at the tip of the cam follower mounting plates 96 mounted on both sides of the fin guide holding plate 89.

The helical tension spring 99 is provided between the spring engagement 98 fixed to a cam follower mounting member 100 for rotatably supporting the cam follower 97 arranged at one end of one of the cam follower mounting plates 96, and the spring engagement 98 fixed to a spring engagement mounting part 101 arranged at one end of another cam follower mounting plate 96.

In the no-load state where the cam follower 97 is not loaded, the helical tension spring 99 is contracted as shown in FIG. 23A wherein the side fin clamp plates 90, 92 are in parallel to the fin guide holding plate 89. When the cam follower 97 is loaded, the helical tension spring 99 is extended as shown in FIG. 24A wherein the side fin clamp plates 90, 92 are not in parallel to the fin guide holding plate 89.

Figure 24A:
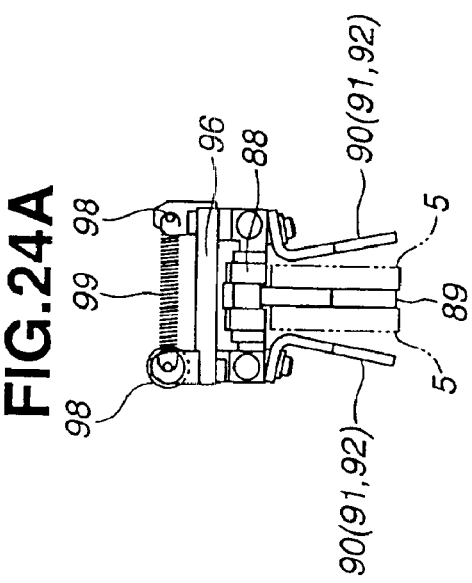
FIG. 24A is a view similar to FIG. 23A, showing the fin holding member with the fin clamp plate opened.
Figure 24B:
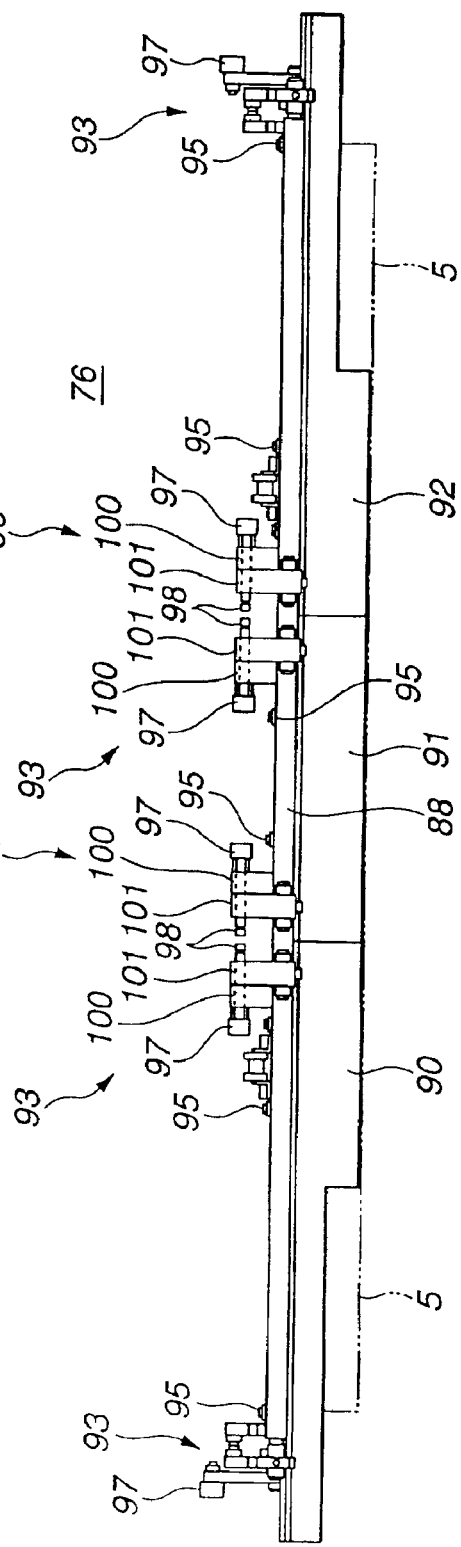
FIG. 24B is a view similar to FIG. 23B, showing the fin holding member.

In the state shown in FIG. 23A, the fins 5 are held by the fin guide holding plate 89 and the fin clamp plates 90, 91, 92, whereas in the state shown in FIG. 24A, the fins 5 are inserted into the widened spaces between the fin guide holding plate 89 and the fin clamp plates 90, 91, 92. The states shown in FIG. 23A and 24A occur when the cam follower 97 moves into a long cam 102 with U-shaped section shown in FIGS. 20–21.

D-2e. Fin Inserting Member

Figure 25A:
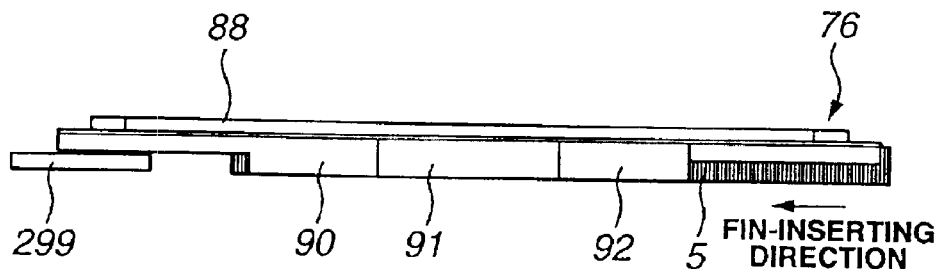
FIG. 25A is a view similar to FIG. 24B, showing a fin being inserted into the fin holding member.

As shown in FIG. 20, the fin inserting member 77, provided at the fin dropping position, serves to press downward the fin 5 held by the fin holding member 76 brought to the fin dropping position and insert it between the tubes 3, 4 arranged on the set base 30. As shown in FIG. 25D, when the fin holding member 76 is brought to the fin dropping position, a fin dropping member 103 driven and controlled vertically movably is inserted through the air introducing hole 94 formed in the main body frame 88, by which the fin inserting member 77 drops fin 5 held by the fin clamp plates 90, 91, 92.

Figure 21:
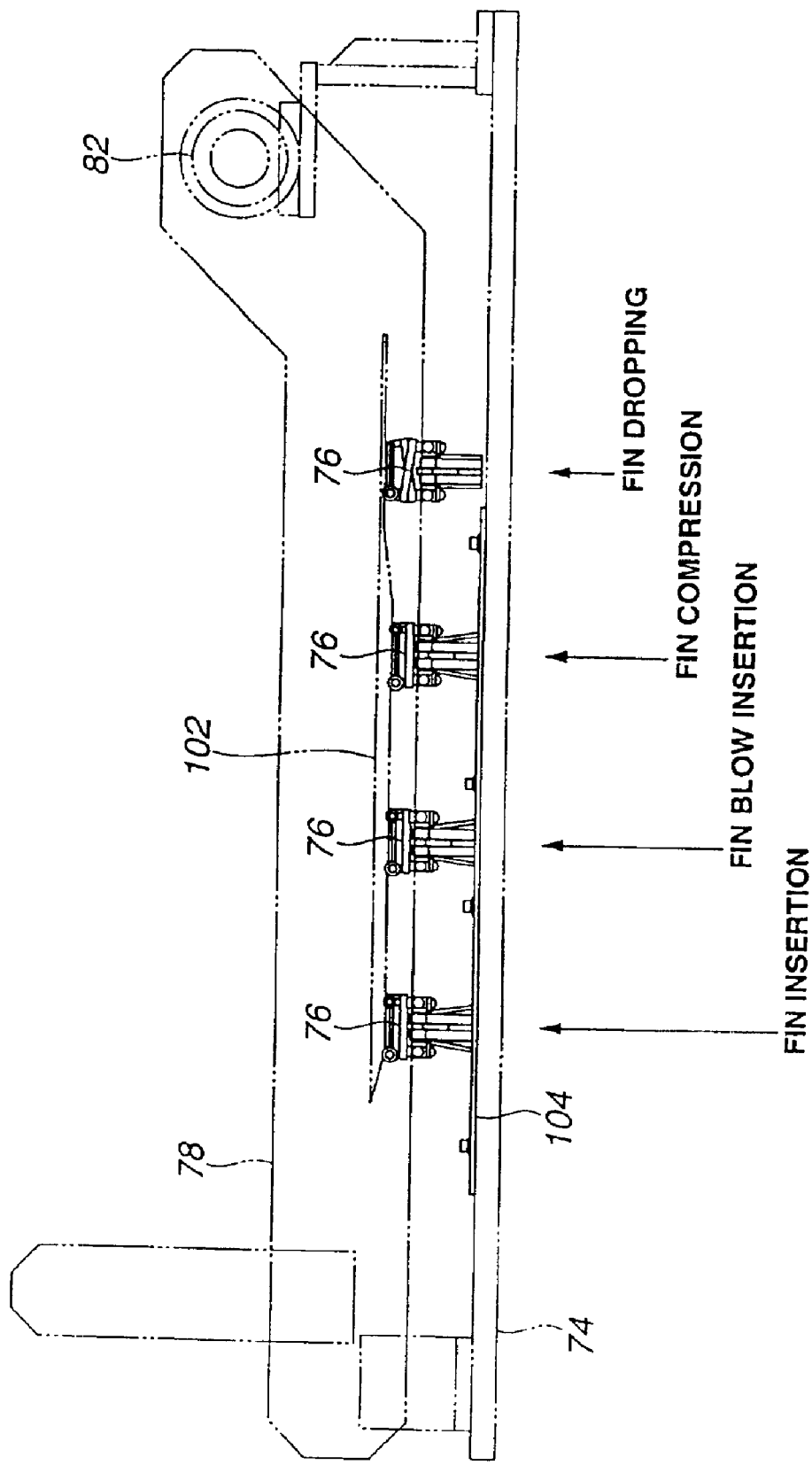
FIG. 21 is a diagrammatic view showing fin arranging.
Figure 22:
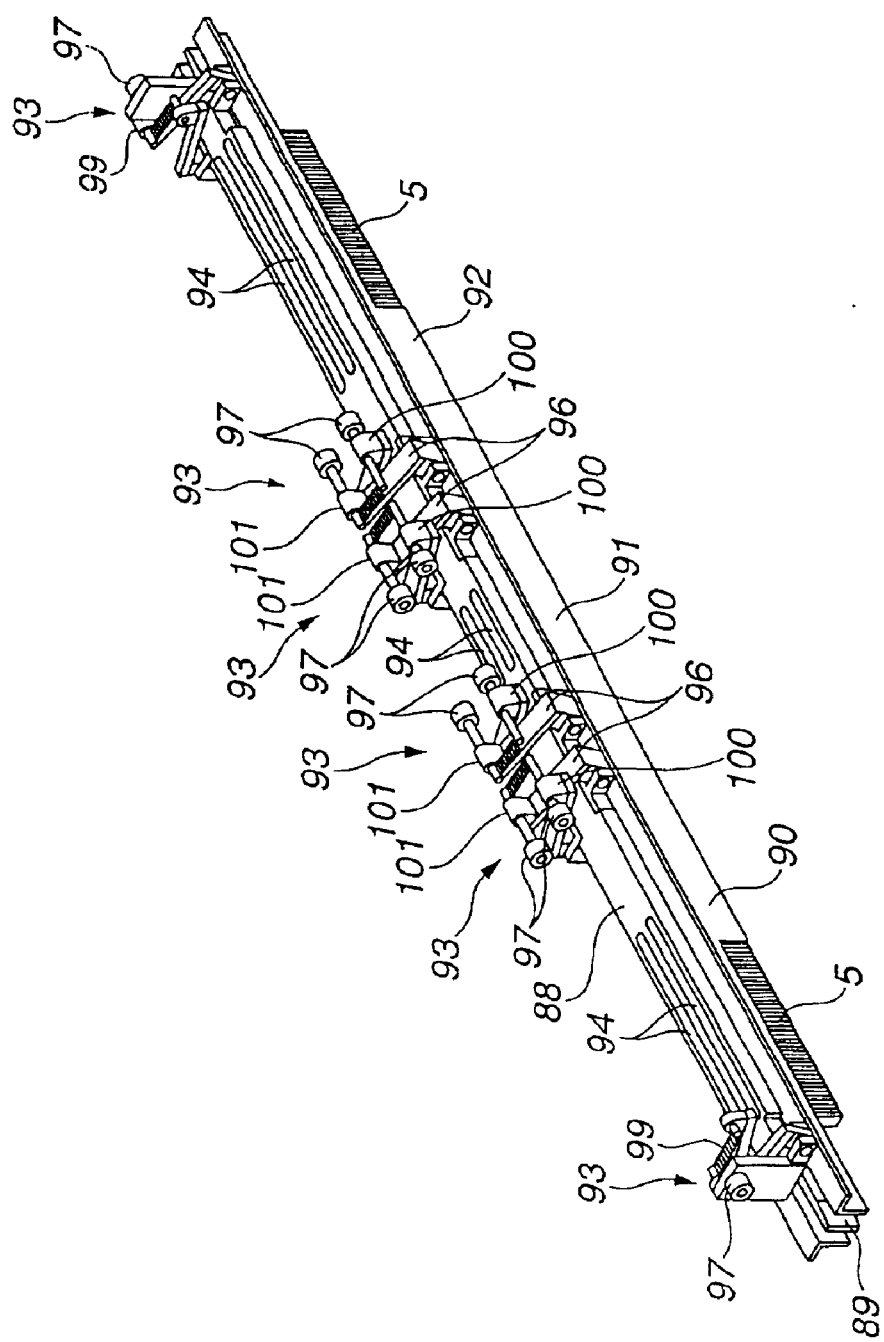
FIG. 22 is a view similar to FIG. 9, showing a fin holding member.

When dropping, the fin 5 should be inserted between the positioning members 34 arranged along the length of the radiator tubes 3 and condenser tubes 4. Thus, both sides of the fin 5 are first inserted between the tubes 3, 4 by the fin dropping member 103, and then the center portion of the fin 5 is dropped therein. This allows smooth insertion of the fin 5 between the tubes 3, 4. As shown in FIG. 21, a fin arranging plate 104 is provided on the frame 74 at least from the fin inserting position to before the fin dropping position. At the fin dropping position, there is no fin arranging plate 104 because the fin 5 is to be dropped downward there.

E. Header Mounting Device

As shown in FIG. 6, a header mounting device 106, disposed on the header mounting part 13, is a device for receiving the radiator header 7 and condenser header 6 held by the temporary header holder 32 and mounting them to tubes with the fins 5 inserted.

Figure 27:
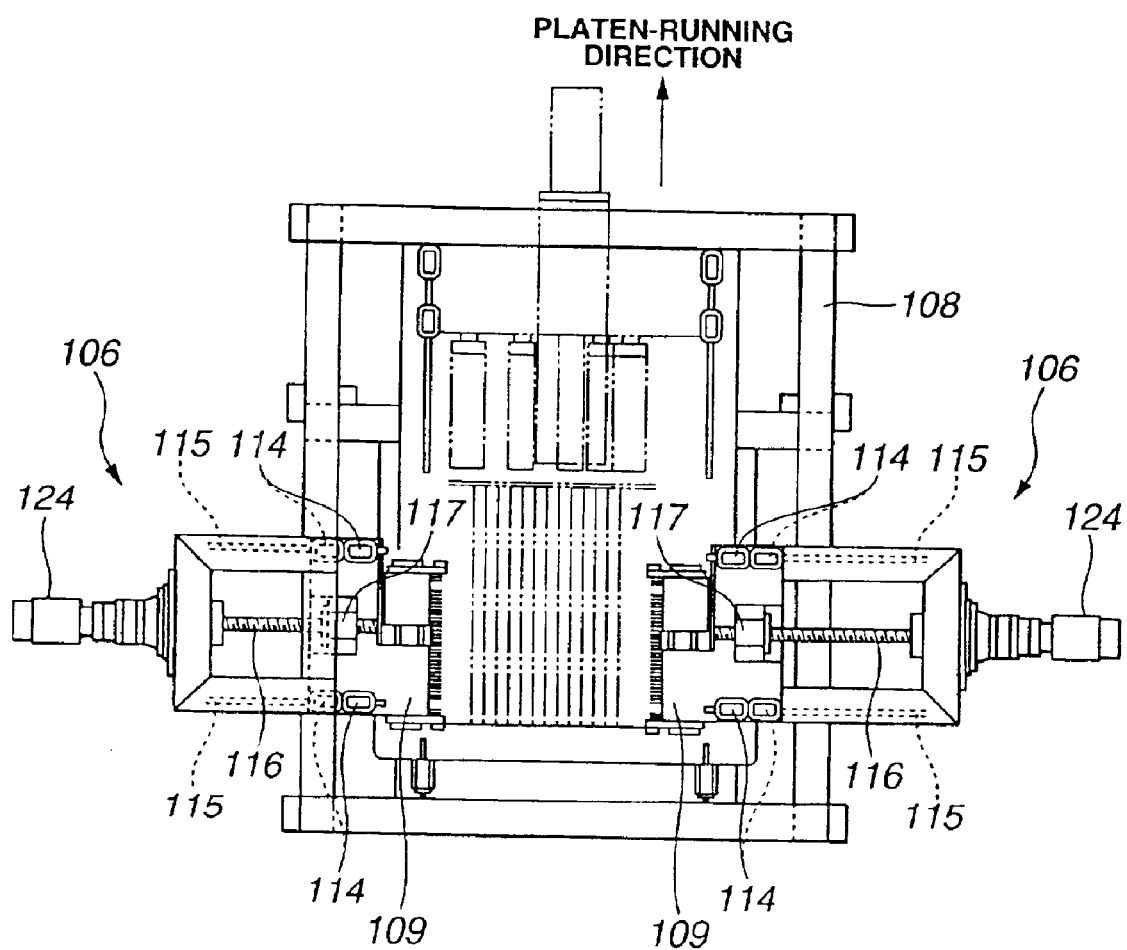
FIG. 27 is a view similar to FIG. 23, showing a header mounting device provided in a header mounting part.
Figure 28:
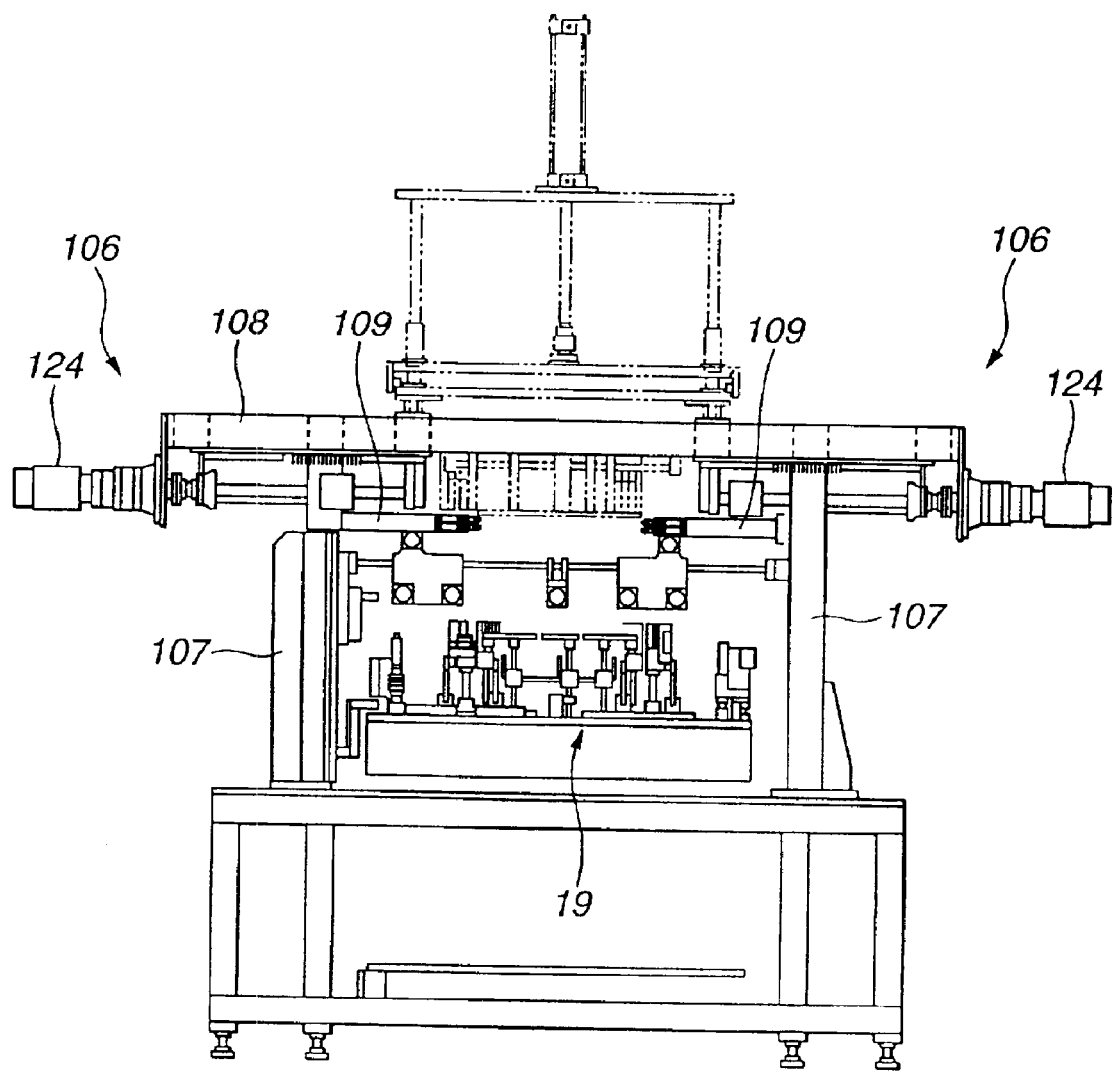
FIG. 28 is a view similar to FIG. 25D, showing the header mounting device provided in the header mounting part.

Referring to FIGS. 27–28, the header mounting device 106 is mounted to a frame 108 supported by a plurality of supports 107 in the direction roughly at right angles to the running direction of the platen 19. Referring to FIGS. 29A–31C, the header mounting device 106 comprises a slide main body 109, a radiator header positioning member 110 and condenser header positioning member 111 and radiator header clamping member 112 and condenser header clamping member 113 fixed to the slide main body 109, and a driving means for moving the slide main body 109 back and forth.

E-1. Slide Main Body

Figure 29A:
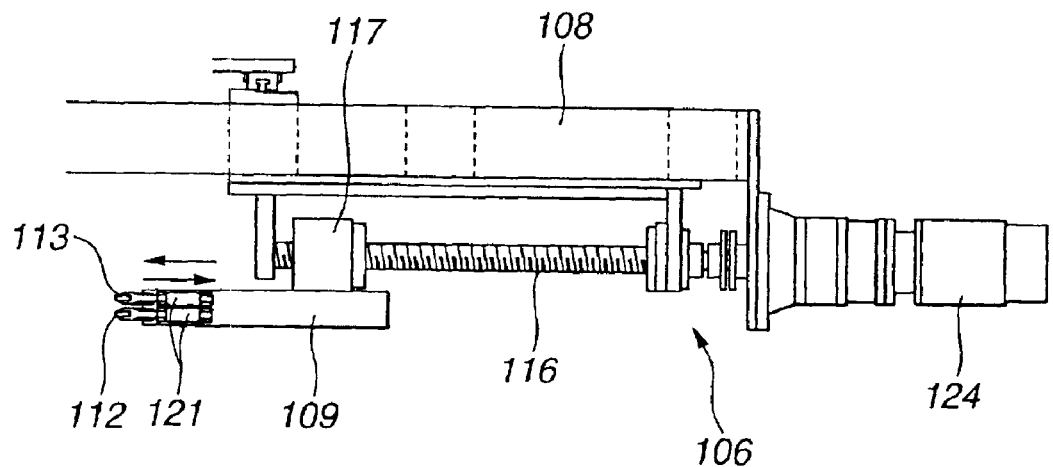
FIGS. 29A–29B are views similar to FIG. 16C, each showing the header mounting device.

As shown in FIGS. 29A and 31B, a plurality of LM guides 114 is provided on the top surface of the slide main body 109 so as to be movable along a rail 115 mounted on the frame 108. Moreover, a ball screw fitting member 117 is provided on the top surface of the slide main body 109 to protrude upward, and incorporates a nut member mounted to a ball screw 116 constituting a forward/backward movement driving means as will be described later.

E-2. Radiator Header Positioning Member and Condenser Header Positioning Member Referring to FIGS. 30 and 32A–32B, the radiator header positioning member 110 is provided with a roughly U-shaped positioning concave 118 engaging with one side of the radiator header 7 formed as a square pipe with rectangular section. The radiator header 7 is positioned by engaging the one side of the radiator header 7 with the positioning concave 118.

As shown in FIGS. 30 and 32A–32B, the condenser header positioning member 111 is provided with a positioning concave 119 with roughly V-shaped section for supporting at two points the condenser header 6 formed as a round pipe with circular section. The condenser header 6 is positioned by engaging the condenser header 6 with the positioning concave 119.

As shown in FIGS. 30 and 31A–31C, in order to allow secure positioning of the radiator header 7 and condenser header 6 even if they are different in size, the radiator header positioning member 110 and condenser header positioning member 111 are different and distinct members, one being freely movable along a rail 120.

E-3. Radiator Header Clamping Member and Condenser Header Clamping Member

Figure 33:
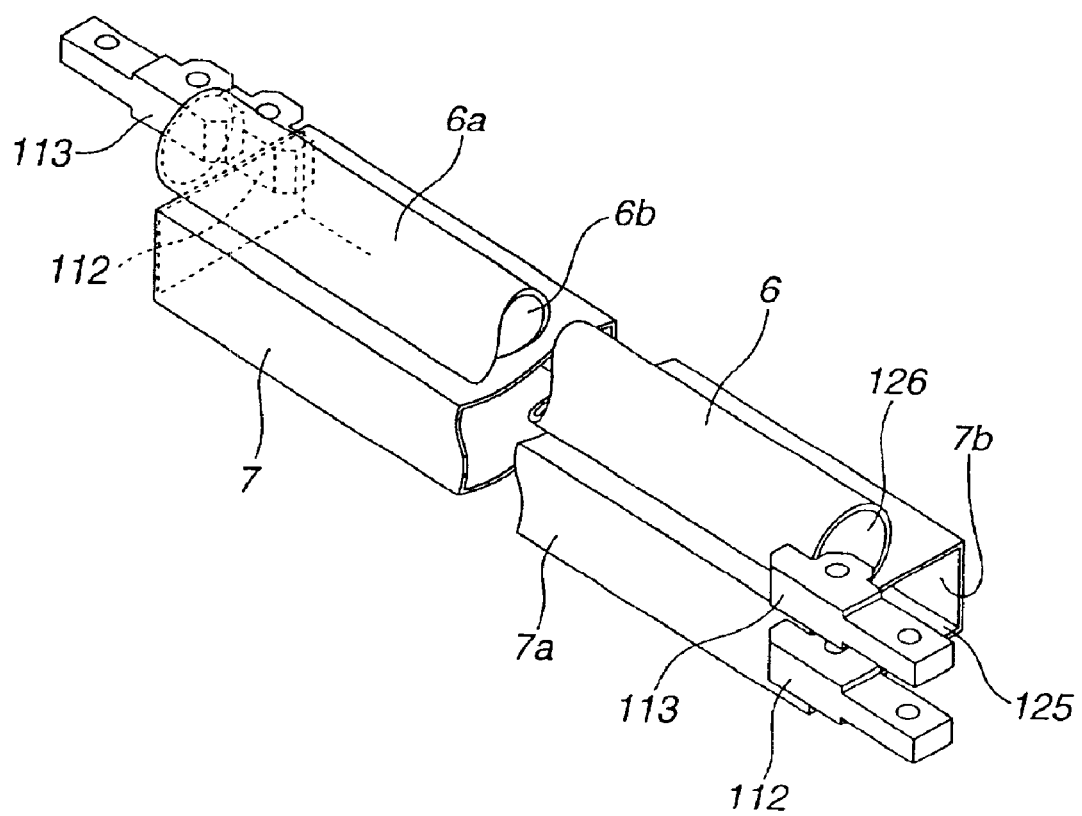
FIG. 33 is a view similar to FIG. 26, showing the radiator header and condenser header clamped by a radiator header clamping member and a condenser header clamping member.

As shown in FIGS. 30 and 33, the radiator header clamping member 112 and condenser header clamping member 113 are formed as a roughly L-shaped hook. The radiator header clamping member 112 and condenser header clamping member 113 are both movable through cylinders 121 provided on the side of the slide main body 109.

As shown in FIG. 33, the radiator header clamping member 112 provided on one side of the slide main body 109 holds an outer wall 7a of the radiator header 7 from outside to clamp the radiator header 7 by pressing it against the radiator header positioning member 110. The radiator header clamping member 112 on the other side is inserted into an opening 122 of the radiator header 7, and holds from inside an inner wall 7b on the rear side to be engaged with the positioning concave 118 so as to clamp the radiator header 7 by pressing it against the radiator header positioning member 110.

Similarly, as shown in FIG. 33, the condenser header clamping member 113 on one side holds from outside an outer wall 6a of the condenser header 6 to clamp the condenser header 6 by pressing it against the condenser header positioning member 111. The condenser header clamping member 113 on the other side is inserted into an opening 123 of the condenser header 6, and holds from inside an inner wall 6b on the side to be engaged with the positioning concave 119 so as to clamp the condenser header 6 by pressing it against the condenser header positioning member 111.

The radiator header 7 having rear end engaged with the positioning concave 118 is pressed against the radiator header positioning member 110 and clamped by the radiator header clamping member 112, allowing secure holding of the radiator header 7. Similarly, the condenser header 6 having rear end engaged with the positioning concave 119 is pressed against the condenser header positioning member 111 and clamped by the condenser header clamping member 113, allowing secure holding of the condenser header 6.

E-4. Forward/Backward Movement Driving Means

Figure 29B:
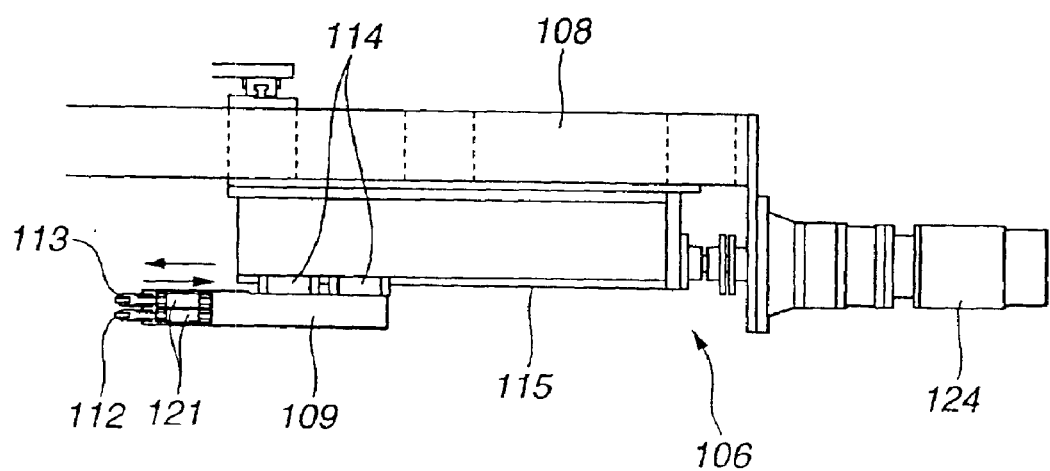

As shown in FIGS. 27 and 29A–29B, the forward/backward movement driving means comprises ball screw 116 provided on the frame 108, a drive motor 124 for rotating the ball screw 116, and a nut member incorporated in the ball screw fitting member 117.

The ball screw 116 is rotated by the drive motor 124. Rotation of the ball screw 116 can move the slide main body 109 mounted to the ball screw 116 through the nut member along the rail 115. The moving direction of the slide main body 109 is roughly at right angles to the running direction of the platen 19.

The header mounting part 13 is provided with a lifting mechanism part, not illustrated, for lifting the platen 19 in its entirety, a compressing mechanism part, not illustrated, for compressing the radiator tubes 3, condenser tubes 4 and fins 5 arranged in predetermined numbers, and a positioning member having comb-teeth shape with the same slits as those of the positioning arranging member 34 and vertically movably provided on the frame 108. The positioning arranging member 34 rises from bottom to top to insert tubes into the slits 37 for their positioning and arranging, whereas the positioning member descends from top to bottom to insert tubes into the slits 37 for positioning and holding of the tubes and fins compressed and temporarily assembled.

F. Explanation of Operation of Heat Exchanger Manufacturing System

The following explains successively a series of processes for manufacturing the heat exchanger incorporating radiator and condenser using the above heat exchanger manufacturing system.

F-1. Process Before Tube Arranging

Figure 34:
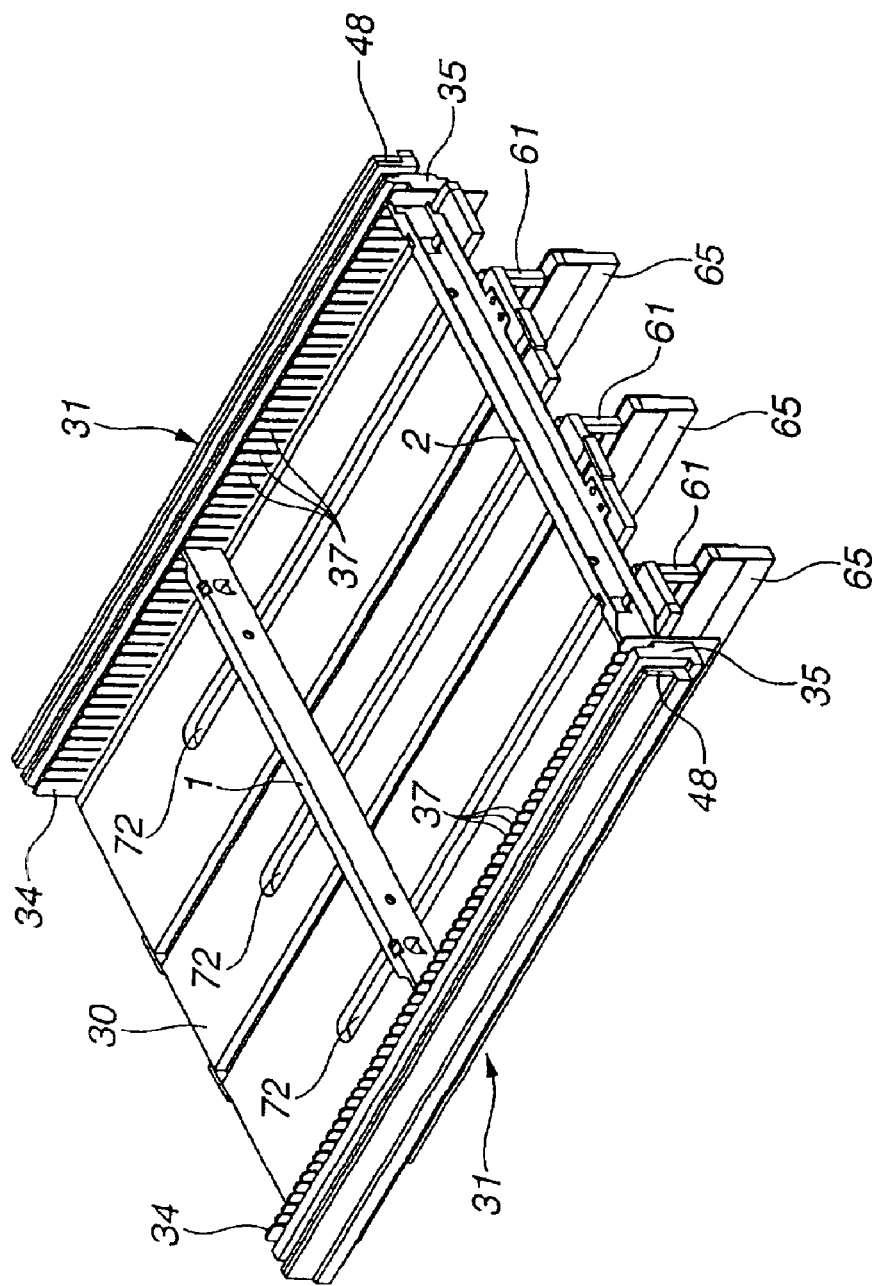
FIG. 34 is a view similar to FIG. 33, showing reinforces mounted to a positioning arranging member of a tube arranging device provided on the platen.

Referring to FIGS. 11 and 34, the tube arranging device is actuated to raise the positioning arranging members 34, end face restricting members 35, and tube supporting members 36 to a tube arranging set position protruding upward from both sides of the set base 30. Then, both ends of the upper and lower reinforces 1, 2 are inserted into the slits 37 of the positioning arranging members 34 at desired positions as shown in FIG. 34. Thus, the arranging positions of the upper and lower reinforces 1, 2 are determined by means of the positioning arranging members 34.

Then, the radiator header 7 and condenser header 6 are temporarily held by the temporary header holding device 32 disposed on the platen 19. In order to hold the radiator header 7, slits 59 formed in the radiator header 7 are engaged with the radiator header positioning claws 52 as shown in FIG. 17. Similarly, in order to hold the condenser header 6, slits 58 formed in the condenser header 6 are engaged with the condenser header positioning claws 53. Then, as shown in FIG. 18, the radiator header 7 and condenser header 6 are clamped by the clampers 54, 54. Until the platen 19 moves to the header mounting part 13, the radiator header 7 and condenser header 6 are kept on standby at the bottom dead center position below the set base 30 shown in solid line in FIG. 11.

Then, the baking jig 61 is set to the jig holder 65 of the baking jig assembling device 33 disposed on the platen 19. The baking jig 61 is kept on standby at the bottom dead center position below the set base 30 shown in solid line in FIG. 11.

Thus, in the stage before assembling the radiator tubes 3, condenser tubes 4 and fins 5, the reinforces 1, 2, radiator headers 7, and condenser headers 6 are mounted on the platen 19 in advance. Then, the platen 19 is moved to the radiator tube arranging part 10.

F-2. Tube Arranging Process

The radiator tubes 3 brought by the conveyor 17 and tube loader 18 are assembled to the platen 19 brought to the radiator tube arranging part 10. The radiator tubes 3 are successively inserted into the slits 37 formed in the positioning arranging member 34 as shown in FIG. 16A, and are arranged in parallel at a predetermined spacing between the upper and lower reinforces 1, 2 as shown in FIG. 1B. A clearance is defined between the end face 3a of the radiator tube 3 and the end face 35a of the end face restricting member 35 to facilitate insertion of the radiator tube 3 into the slit 37. The lower end face of the radiator tube 3 in the longitudinal direction is provided on the set base 30.

Upon completion of arranging the radiator tubes 3, the platen 19 is transported to the condenser tube arranging part 11 where the condenser tubes 4 successively brought from the tube stocker 24 by the tube loader 25 are assembled. The condenser tubes 4 are arranged double at a predetermined distance just above the radiator tubes 3 as shown in FIG. 16A. Specifically, when inserting the condenser tube 4 into the slit 37 with the radiator tube 3 inserted therein, the tip of the condenser tube 4 is placed on the tube supporting member 36. That is, the condenser tube 4 is supported on the tube supporting member 36, and is arranged at a predetermined distance with respect to the radiator tube 3 disposed just below it. A clearance is defined between the end face 4a of the condenser tube 4 and the end face 35b of the end face restricting member 35 to facilitate insertion of the condenser tube 4 into the slit 37.

Upon completion of arranging the condenser tubes 4 to the positioning arranging member 34, the platen 19 is transported to the fin inserting part 12.

F-3. Fin Inserting Process

At the fin inserting part 12, the fins 5 formed at the fin forming part 9 are successively fed by the fin feeding mechanism part 16, and are inserted into the space between tubes by the fin inserting device. The fins 5 fed to the fin inserting part 12 are held at the fin inserting position shown in FIG. 21 by the fin holding member 76 mounted to the conveyor 75. Specifically, at the fin inserting position, the fin clamp plates 90, 91, 92 provided on the fin holding member 76 are opened as shown in FIG. 24A by the cam 102. The fin 5 is inserted from one end to the other end between the fin clamp plates 90, 91, 92 and the fin guide holding plate 89 as shown in FIG. 25A.

Figure 25B:
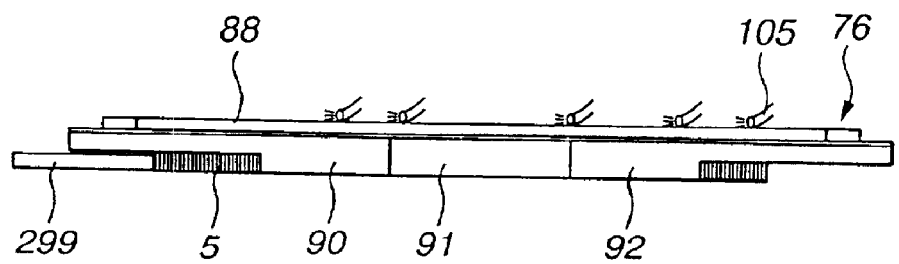
FIG. 25B is a view similar to FIG. 25A, showing the fin being inserted inward by air blow.
Figure 25C:
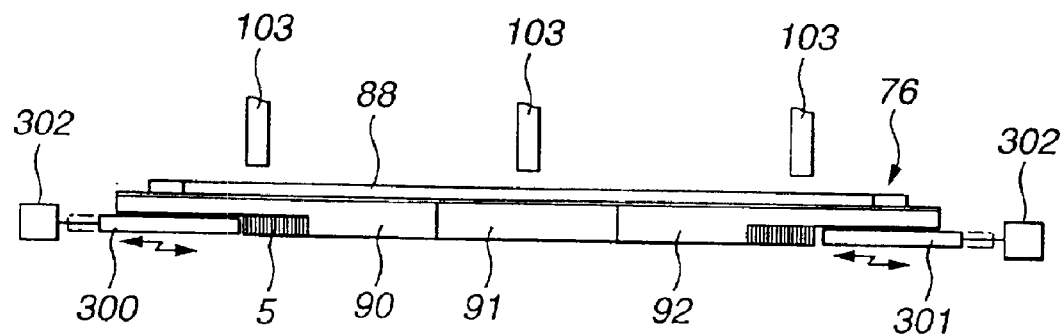
FIG. 25C is a view similar to FIG. 25B, showing the fin being compressed.
Figure 25D:
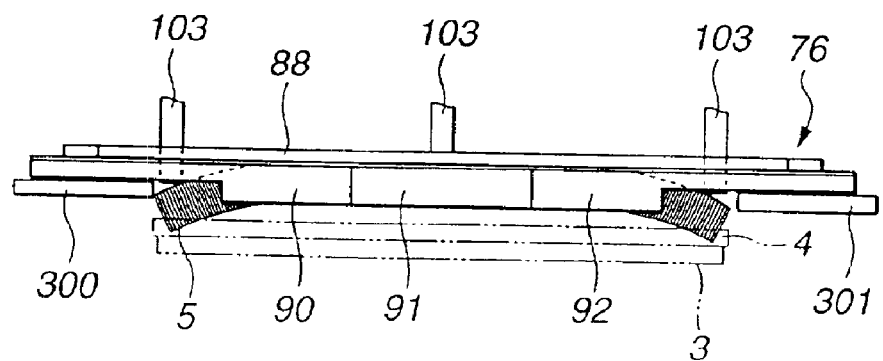
FIG. 25D is a view similar to FIG. 25C, showing the fin being dropped.

The fin holding member 76 with the fin 5 inserted therein is transported by the conveyor 75 to a fin blow inserting position shown in FIG. 21, wherein air is blown toward the fin 5 through the air introducing hole 94 formed in the fin holding member 76, moving the fin inward as shown in FIG. 25B and FIG. 26. The fin 5 is brought into contact with a positioning guide member 300 disposed on the inward side as viewed in the inserting direction. Then, the fin holding member 76 is transported to a fin compressing position shown in FIG. 21, wherein the fin 5 is compressed along the length by fin compressing members 300, 301 which are slidable through a cylinder 302 shown in FIG. 25C. Compression of the fin 5 is carried out to achieve the length allowing insertion into the space between tubes.

Figure 35:
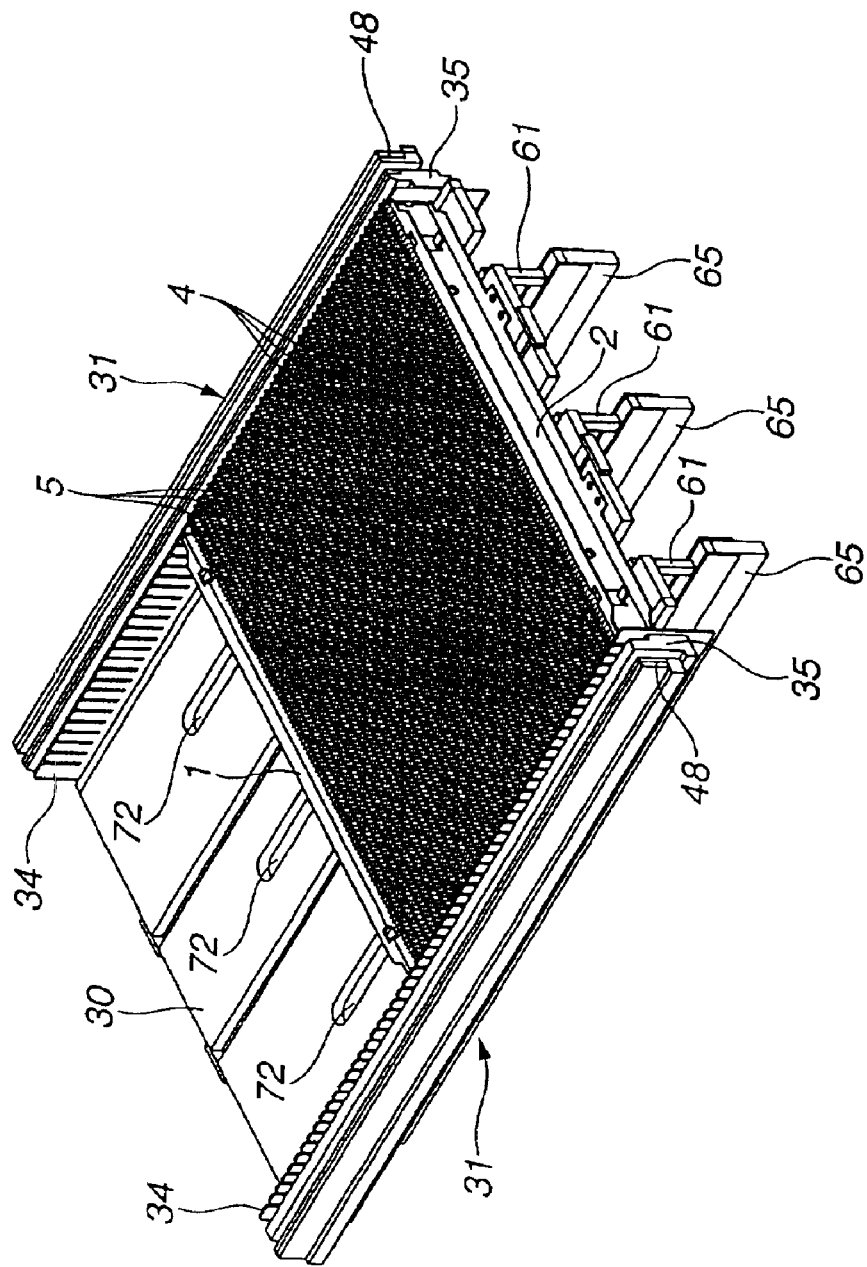
FIG. 35 is a view similar to FIG. 34, showing fins inserted between tubes after arranging the reinforces, radiator tube, and condenser tube to the positioning arranging member of the tube arranging device.
Figure 36A:
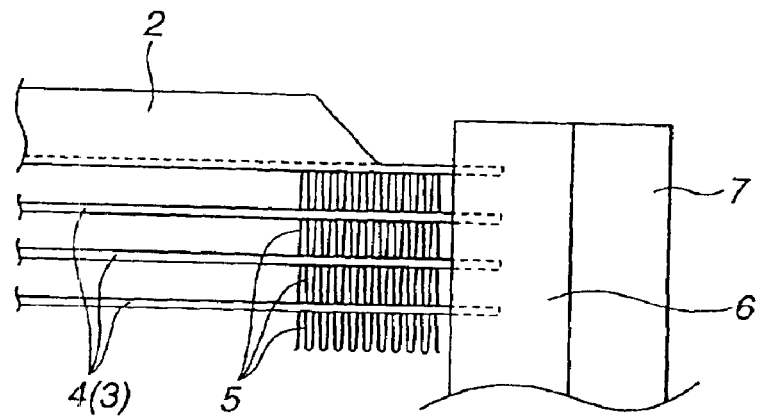
FIGS. 36A–36C are views similar to FIG. 21, showing the radiator header and condenser header mounted to the heat exchanger temporarily assembled.
Figure 36B:
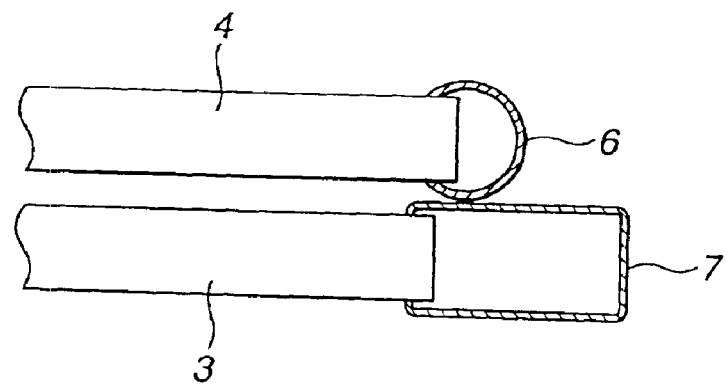
Figure 36C:
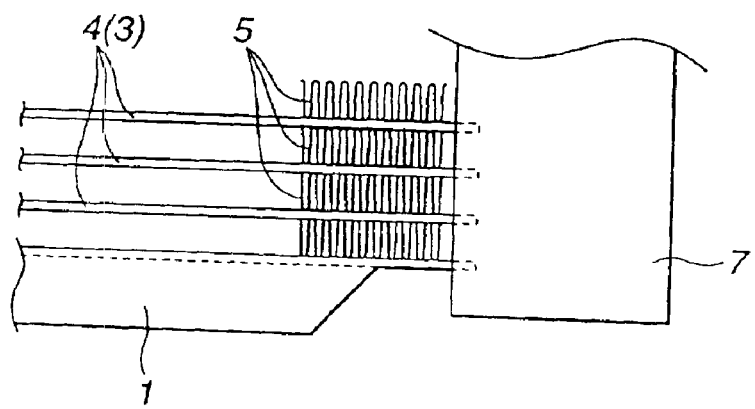

While the fin holding member 76 is transported to the fin dropping position shown in FIG. 21, the fin clamp plates 90, 91, 92 are closed by the cam 102 as shown in FIG. 23A to hold the fin 5. When the fin holding member 76 arrives at the fin dropping position, the fin inserting member 77 shown in FIG. 20 drops the fin 5 held by the fin clamp plates 90, 91, 92 and the fin guide holding plate 89 between tubes on the platen 19 which is on standby therebelow. Upon dropping of the fin 5, both ends of the fin 5 are dropped, prior to the center portion, into the space between tubes by the fin dropping member 103 as shown in FIG. 25D. Subsequently, the center portion of the fin 5 is pressed in the space by the fin dropping member 103, thus inserting the fin 5 in its entirety between tubes. In the similar way, referring to FIG. 35, the fins 5 are successively inserted between tubes. When completing insertion of the fins 5, the platen 19 is transported to the header mounting part 13.

F-4. Header Mounting Process

When the platen 19 is brought to the header mounting part 13, the platen 19 is raised in its entirety by a lifting mechanism part, not illustrated. Then, the tube arranging device 31 is moved in its entirety as shown in FIG. 16B to press the end face restricting member 35 against the temporarily assembled tubes. This results in alignment of the end faces 3a, 4a of the radiator tubes 3 and condenser tubes 4. Then, as shown in FIG. 16C, the tube holding member 36 is pressed to compress the fins 5. Since the notches 1a, 2a are formed at both ends of the reinforces 1, 2, the end face position of the fins 5 can be restricted with the tube supporting member 36 failing to abut on the reinforces 1, 2. The comb-teeth shaped positioning arranging member 34 is lowered to a position below the set base 30, and then the temporarily assembled tubes and fins are compressed by the compressing mechanism part in the tube/fin arranging direction shown in FIG. 3.

Subsequently, the radiator header 7 and condenser header 6 temporarily held by the temporary header holding device 32 provided on both sides of the platen 19 are raised to the header mounting position of the temporarily assembled tubes and fins. Then, the header mounting device 106 shown in FIG. 27 approaches the radiator header 7 and condenser header 6 to grasp with the respective clamping members 112, 113 the headers 7, 6 temporarily held by the temporary header holding device 32.

Specifically, the radiator header 7 is positioned by abutting on the radiator header positioning member 110, and is clamped by the radiator header clamping members 112, 112 as shown in FIG. 33. Similarly, the condenser header 6 is positioned by abutting on the condenser header positioning member 111, and is clamped by the condenser header clamping members 113, 113. When received from the temporary header holding device 32, the radiator header 7 and condenser header 6 are mounted to the compressed tubes.

Then, the baking jig assembling device 33 is actuated to raise the baking jig 61 from below to above the set base 30 and assemble it to the heat exchanger with radiator header 7 and condenser header 6 mounted thereto. After mounting the baking jig 61, the platen 19 is lowered and bought to a heat exchanger take-out position along the upper rail 20, wherein the assembled heat exchanger is removed from the platen 19. The empty platen 19 is lowered on the lower rail 21 by the platen lowering mechanism part 22 to return to the radiator tube arranging part 10.

The heat exchanger incorporating the radiator and condenser is manufactured through the above processes. In the illustrative embodiment, for easy understanding of the present invention, an explanation is made with regard to a single platen running on the rail. Actually, a plurality of platens continuously runs to promote the productivity of heat exchangers.

Having described the present invention with regard to the preferred embodiment, it is noted that the present invention is not limited thereto, and various changes and modifications can be made without departing form the scope of the present invention. By way of example, in the illustrative embodiment, an explanation is made with regard to manufacturing of heat exchangers incorporating first and second heat exchangers, but it goes without saying that the present invention is applicable when manufacturing heat exchangers with a single heat exchanger. Moreover, in the illustrative embodiment, the reinforces 1, 2 are parts common to the first and second heat exchangers, but, they may be separate and distinct parts.

The entire teachings of Japanese Patent Application 2000-403382 filed Dec. 28, 2000 are incorporated hereby by reference.

What is claimed is:

1. A method of manufacturing a heat exchanger, comprising:

arranging tubes at a predetermined pitch on a set base;

inserting fins into spaces each defined between the tubes;

compressing the tubes and the fins in a direction of arrangement thereof;

mounting hollow headers to longitudinal ends of the tubes, each header having slits engaged with a corresponding end of the tubes, the hollow headers mounting being carried out by pressing the headers against a header positioning member, the hollow headers mounting being carried out by clamping the headers by a header clamping member by holding an outer wall of the headers by a first portion of the header clamping member and an inner wall of the headers by a second portion of the header clamping member, the second portion being inserted into openings of the headers; and attaching covers to both ends of the headers, each cover closing holes which open at the corresponding end of the headers.

2. The method as claimed in claim 1, wherein the spaces are parallel to each other and extend along the length of the tubes.

3. The method as claimed in claim 1, wherein the hollow header mounting is further carried out by temporarily holding each header in a corresponding header positioning claw prior to clamping each header in place.

4. A method of manufacturing an incorporated heat exchanger incorporating first and second heat exchangers, comprising:

arranging first tubes for the first heat exchanger at a predetermined pitch on a set base;

arranging second tubes for the second heat exchanger at the same predetermined pitch just above the first tube with a predetermined distance therebetween;

inserting fins into first spaces each defined between the first tubes and second spaces each defined between the second tubes, the fins extending over the predetermined distance;

compressing the first and second tubes and the fins in a direction of arrangement thereof;

mounting first hollow headers to longitudinal ends of the first tubes, each header having slits engaged with a corresponding end of the first tubes;

mounting second hollow headers to longitudinal ends of the second tubes, each header having slits engaged with a corresponding end of the second tubes;

the first and second hollow headers mounting being carried out by pressing the headers against a header positioning member, the hollow headers mounting being further carried out by clamping the headers by a header clamping member, the hollow headers mounting being carried out by holding an outer wall of the headers by a first portion of the header clamping member and an inner wall of the headers by a second portion of the header clamping member, the second portion being inserted into openings of the headers; and attaching covers to both ends of the first and second headers, each cover closing holes which open at the corresponding end of the first and second headers.

5. The method as claimed in claim 4, wherein the covers are integrally formed with each other.

6. The method as claimed in claim 4, wherein the first and second spaces are parallel to each other and extend along the length of the first and second tubes, wherein the first and second spaces are in alignment with each other.

7. The method as claimed in claim 4, wherein the second tubes are longer than the first tubes.

8. A method of manufacturing a heat exchanger, comprising:

arranging tubes at a predetermined pitch on a set base;

inserting fins into spaces each defined between the tubes;

compressing the tubes and the fins in a direction of arrangement thereof;

mounting hollow headers to longitudinal ends of the tubes, each header having slits engaged with a corresponding end of the tubes, the mounting step being carried out by pressing the headers against a header positioning member and clamping them by a header clamping member, the mounting step being carried out by holding an outer wall of the headers by a first portion of the header clamping member and an inner wall of the headers by a second portion of the header clamping member, the second portion being inserted into openings of the headers; and attaching covers to both ends of the headers, each cover closing holes which open at the corresponding end of the headers.

9. A method of manufacturing an incorporated heat exchanger incorporating first and second heat exchangers, comprising:

arranging first tubes for the first heat exchanger at a predetermined pitch on a set base;

arranging second tubes for the second heat exchanger at the same predetermined pitch just above the first tube with a predetermined distance therebetween;

inserting fins into first spaces each defined between the first tubes and second spaces each defined between the second tubes, the fins extending over the predetermined distance;

compressing the first and second tubes and the fins in a direction of arrangement thereof;

mounting first hollow headers to longitudinal ends of the first tubes, each header having slits engaged with a corresponding end of the first tubes;

mounting second hollow headers to longitudinal ends of the second tubes, each header having slits engaged with a corresponding end of the second tubes, the mounting steps being carried out by pressing the first and second headers against a header positioning member and clamped by a header clamping member, the mounting step being carried out by holding an outer wall of the first and second headers by a first portion of the header clamping member and an inner wall of the first and second headers by a second portion of the header clamping member, the second portion being inserted into openings of the first and second headers; and attaching covers to both ends of the first and second headers, each cover closing holes which open at the corresponding end of the first and second headers.

10. The method as claimed in claim 9, wherein the second tubes are longer than the first tubes.

11. A method of manufacturing a heat exchanger, comprising:

arranging a plurality of tubes, wherein each of the plurality of tubes is spaced at a predetermined pitch from an adjacent tube;

inserting fins into the spaces defined between adjacent tubes;

compressing the tubes and the fins in a direction lateral to the longitudinal axes of the tubes and the fins;

mounting hollow headers to longitudinal ends of the tubes, each header having slits for engaging with a corresponding end of the tubes, the mounting step being carried out by pressing the headers against a header positioning and clamping the headers using a header clamping member, wherein a first portion of the header clamping member holds an outer wall of the headers, and a second portion of the header clamping member is inserted into at least one opening in each of the headers; and attaching covers to both ends of the headers, each cover closing holes at the corresponding end of the headers.

12. A method of manufacturing an incorporated heat exchanger incorporating first and second heat exchangers, comprising:

arranging first tubes for the first heat exchanger at a predetermined pitch;

arranging second tubes for the second heat exchanger at the same predetermined pitch as the first tubes and at a predetermined distance from the first tubes;

inserting fins into first spaces defined between adjacent ones of the first tubes and second spaces defined between adjacent ones of the second tubes, the fins extending over the predetermined distance;

compressing the first and second tubes and the fins in a direction lateral to the longitudinal direction the first and second tubes and the fins;

mounting first hollow headers to longitudinal ends of the first tubes, each first hollow header having slits engaged with a corresponding end of the first tubes;

mounting second hollow headers to longitudinal ends of the second tubes, each second hollow header having slits engaged with a corresponding end of the second tubes;

the first and second hollow headers mounting being carried out by pressing the headers against a header positioning member and clamping the headers using a header clamping member, wherein a first portion of the header clamping member holds an outer wall of the headers, and a second portion of the header clamping member is inserted into at least one opening in each of the headers; and attaching covers to both ends of the first and second headers, each cover closing holes which open at the corresponding end of the first and second headers.

13. A method of manufacturing according to claim 12, wherein the steps of arranging the first tubes and the second tubes comprises:

setting a pitch between adjacent tubes using a positioning arranging member;

restricting the longitudinal ends of the plurality of tubes using a restricting member; and securing a space between the respective tubes of the first and second headers.

* * * * *